(12) United States Patent
Liu et al.

(10) Patent No.: US 10,567,799 B2
(45) Date of Patent: Feb. 18, 2020

(54) SIMPLIFIED SUB-PREDICTION UNIT (SUB-PU) MOTION PARAMETER INHERITANCE (MPI)

(71) Applicants: QUALCOMM Incorporated, San Diego, CA (US); Hongbin Liu, Beijing (CN); Ying Chen, San Diego, CA (US)

(72) Inventors: Hongbin Liu, Beijing (CN); Ying Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 530 days.

(21) Appl. No.: 15/119,057

(22) PCT Filed: Mar. 7, 2014

(86) PCT No.: PCT/CN2014/073039
§ 371 (c)(1),
(2) Date: Aug. 15, 2016

(87) PCT Pub. No.: WO2015/131387
PCT Pub. Date: Sep. 11, 2015

(65) Prior Publication Data
US 2016/0366442 A1    Dec. 15, 2016

(51) Int. Cl.
*H04N 19/597* (2014.01)
*H04N 19/54* (2014.01)
(Continued)

(52) U.S. Cl.
CPC ........... *H04N 19/597* (2014.11); *H04N 19/52* (2014.11); *H04N 19/53* (2014.11); *H04N 19/533* (2014.11);
(Continued)

(58) Field of Classification Search
None
See application file for complete search history.

(56) References Cited

U.S. PATENT DOCUMENTS

| 9,143,796 B2 | 9/2015 | Bang et al. |
| 2008/0170618 A1 | 7/2008 | Choi et al. |

(Continued)

FOREIGN PATENT DOCUMENTS

| CN | 101222627 A | 7/2008 |
| CN | 101243692 A | 8/2008 |

(Continued)

OTHER PUBLICATIONS

J. An, Y.W. Chen, J.L. Lin, Y.W. Huang, & S. Lei, "3D-CE5.h related: Inter-view motion prediction for HEVC-based 3D video coding", JCT-3V Document A0049 (Jul. 12, 2012) (Year: 2012).*

(Continued)

*Primary Examiner* — David N Werner
(74) *Attorney, Agent, or Firm* — Shumaker & Sieffert, P.A.

(57) ABSTRACT

This disclosure describes techniques for simplifying depth inter mode coding in a three-dimensional (3D) video coding process, such as 3D-HEVC. The techniques include generating a motion parameter candidate list, e.g., merging candidate list, for a current depth prediction unit (PU). In some examples, the described techniques include determining that a sub-PU motion parameter inheritance (MPI) motion parameter candidate is unavailable for inclusion in the motion parameter candidate list for the current depth PU if motion parameters of a co-located texture block to a representative block of the current depth PU are unavailable. In some examples, the described techniques include deriving a sub-PU MPI candidate for inclusion in the motion parameter candidate list for the current depth PU only if a partition mode of the current depth PU is 2N×2N.

29 Claims, 13 Drawing Sheets

(51) Int. Cl.

| | |
|---|---|
| H04N 19/587 | (2014.01) |
| H04N 19/543 | (2014.01) |
| H04N 19/533 | (2014.01) |
| H04N 19/59 | (2014.01) |
| H04N 19/56 | (2014.01) |
| H04N 19/53 | (2014.01) |
| H04N 19/52 | (2014.01) |
| H04N 13/00 | (2018.01) |

(52) U.S. Cl.
CPC ........... *H04N 19/54* (2014.11); *H04N 19/543* (2014.11); *H04N 19/56* (2014.11); *H04N 19/587* (2014.11); *H04N 19/59* (2014.11); H04N 2013/0085 (2013.01); H04N 2213/005 (2013.01)

(56) References Cited

U.S. PATENT DOCUMENTS

| | | |
|---|---|---|
| 2011/0013695 A1 | 1/2011 | Endo |
| 2011/0216833 A1 | 9/2011 | Chen et al. |
| 2012/0051430 A1 | 3/2012 | Pateux et al. |
| 2012/0069905 A1 | 3/2012 | Kato et al. |
| 2012/0230411 A1 | 9/2012 | Liu et al. |
| 2012/0269269 A1 | 10/2012 | Choi et al. |
| 2012/0328017 A1 | 12/2012 | Kawashima |
| 2013/0114717 A1 | 5/2013 | Zheng et al. |
| 2013/0121416 A1* | 5/2013 | He .................. H04N 19/597 375/240.14 |
| 2013/0343459 A1 | 12/2013 | Bici et al. |
| 2014/0085929 A1* | 3/2014 | Leng .................. G02B 6/001 362/612 |
| 2014/0098189 A1 | 4/2014 | Deng et al. |
| 2014/0294087 A1 | 10/2014 | Oh et al. |
| 2015/0003521 A1 | 1/2015 | Thirumalai et al. |
| 2015/0003529 A1 | 1/2015 | Thirumalai et al. |
| 2015/0030073 A1 | 1/2015 | Chen et al. |
| 2015/0085935 A1* | 3/2015 | Chen .................. H04N 19/597 375/240.16 |
| 2015/0131724 A1* | 5/2015 | Lin .................. H04N 19/56 375/240.14 |
| 2016/0134857 A1 | 5/2016 | An et al. |
| 2016/0165263 A1 | 6/2016 | Zhang et al. |

FOREIGN PATENT DOCUMENTS

| | | |
|---|---|---|
| CN | 101601304 A | 12/2009 |
| CN | 102301714 A | 12/2011 |
| CN | 102308585 A | 1/2012 |
| CN | 103096060 A | 5/2013 |
| CN | 103096073 A | 5/2013 |
| CN | 103348651 A | 10/2013 |
| CN | 103609125 A | 2/2014 |
| EP | 2164264 A1 | 3/2010 |
| WO | 2007024072 A1 | 3/2007 |
| WO | WO-2009123248 A1 | 10/2009 |
| WO | 2013016231 A1 | 1/2013 |

OTHER PUBLICATIONS

Chen Y-W., et al., "3D-CE3.h Related: Cross-Check of the results on the MPI Restriction Proposed in JCT3V-D0120",104. MPEG Meeting; Apr. 22, 2013-Apr. 26, 2013; Incheon; (Motion Picture Expert Group or ISO/IEC JTC1/SC29/WG11),, No. m29127, JCT3V-D0267, Apr. 15, 2013 (Apr. 15, 2013). XP030057658, 2 Pages.

Lee J.Y., et al., "3D-CE3.h Related: MPI Restriction", 4. JCT-3V Meeting; Apr. 20, 2013-Apr. 26, 2013; Incheon; (The Joint Collaborative Team on 3d Video Coding Extension Development of ISO/IEC JTC1/SC29/WG11 and ITU-T SG.16 ); URL: http://phenix.int-evry.fr/jct2/,, No. JCTC3V-D0120, Apr. 15, 2013 (Apr. 15, 2013), XP030130784, pp. 1-3.

Supplementary European Search Report—EP14884610—Search Authority—Munich—dated Oct. 6, 2017 (15 pgs).

Zhao X., et al., "CE3 Related: Sub-PU based MPI", 6. JCT-3V Meeting; Oct. 25, 2013-Jan. 11, 2013; Geneva; (The Joint Collaborative Team on 3d Video Coding Extension Development of ISO/IEC JTC1/SC29/WG11 and ITU-T SG.16 ); URL: http://phenix.int-evry.fr/jct2/,, No. JCT3V-F0128, Oct. 18, 2013 (Oct. 18, 2013), XP030131554, pp. 1-3.

An J., et al., "3D-CE3.h related: Sub-PU level inter-view motion prediction", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T - SG.16 ); URL: http://phenix.int-evry.fr/jct2/ No. JCT3V-E0184, XP030131217, Jul. 19, 2013 (Jul. 19, 2013), 34 pages.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross, et al., "High Efficiency Video Coding (HEVC) text Specification Draft 10 (for FDIS & Consent)," 12th Meeting: Geneva, CH, Jan. 14-23, 2013, JCTVC-L1003_v11, 332 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Chuang T-D., et al., "MVP and Merge Candidate Initialization," 100, MPEG Meeting; Apr. 30, 2012-May 4, 2012; Geneva; (Motion Picture Expert Group or ISO/IEC JTC1/SC29/WG11), No. m24420, Apr. 22, 2012 (Apr. 22, 2012), XP030052765, pp. 2.

He L., et al., "Enhanced motion parameter inheritance for depth coding in 3D-HEVC", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-E0229, Jul. 19, 2013 (Jul. 19, 2013), XP030131282 (4 pp).

ITU-T H.261, Line Transmission of Non-Telephone Signals, Video Codec for Audiovisual Services at p x 64 kbits, The International Telecommunication Union, Mar. 1993, 32 pp.

ITU-T H.263, "Video Coding for Low Bit Rate Communication", Series H: Audiovisual and Multimedia Systems, Infrastructure of audiovisual services—Coding of moving video, Jan. 2005, 226 pages.

ITU-T H.264, Series H: Audiovisual and Multimedia Systems, Infrastructure of audiovisual services—Coding of moving video, Advanced video coding for generic audiovisual services, Mar. 2005, 343 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

(56) References Cited

OTHER PUBLICATIONS

ITU-T H.265, "Series H: Audiovisual and Multimedia Systems, Infrastructure of Audiovisual Services—Coding of moving video : High efficiency video coding", The International Telecommunication Union, Apr. 2013, 317 pp.

ITU-T H.265, Series H: Audiovisual and Multimedia Systems, Infrastructure of audiovisual services—Coding of moving video, High efficiency video coding, The International Telecommunication Union, Apr. 2015, 634 pp.

ITU-T H.265, Series H: Audiovisual and Multimedia Systems, Infrastructure of audiovisual services—Coding of moving video, High efficiency video coding, The International Telecommunication Union, Oct. 2014, 540 pp.

Kang J., et al., "3D-CE5.h related: Improvements for disparity vector derivation", 2. JCT-3V Meeting; 102, MPEG Meeting; Oct. 13, 2012-Oct. 19, 2012; Shanghai; (The Joint Collaborative Team on 3D Video Coding Extension Development of ISO/IEC JTC1/SC29/WG11 and ITU-T SG.16); URL: http://phenix.int-evry.fr/-jct2/,, No. JCT3V-B0047, Oct. 10, 2012 (Oct. 10, 2012), 4 pages, XP030130228.

Oh H., et al., "H.264-Based Depth Map Sequence Coding Using Motion Information of Corresponding Texture Video", Gwangju Institute of Science and Texchnology (GIST), Korea, 2006, pp. 898-907.

Sung J., et al., "3D-CE5.h: Simplification of disparity vector derivation for HEVC-based 3D video coding", 1. JCT-3V Meeting; 101. MPEG Meeting; Jul. 16, 2012-Jul. 20, 2012; Stockholm; (The Joint Collaborative Team on 3D Video Coding Extension Development of ISO/IECJTC1/SC29/WG11 and ITU-T SG.16); URL: http://phenix.int-evry.fr/jct2/,, No. JCT3V-A0126, Jul. 14, 2012 (Jul. 14, 2012), pp. 1-4, XP030130125.

Tech, et al., "3D-HEVC Draft Text 1", JCT-3V Meeting; MPEG Meeting; Jul. 27-Aug. 2, 2013; (The Joint Collaborative Team on 3D Video Coding Extension Development of ISO/IEC JTC1/SC29/WG11 and ITU-T SG.16); No. JCT3V-E1001_v3, XP030130664, 89 pp.

Tech et al., "3D-HEVC Test Model 4", JCT-3V Meeting, Incheon, (The Joint Collaborative Team on 3D Video Coding Extension Development of ISO/IEC JTC1/SC29/WG11 and ITU-T SG.16), No. JCT3V-D1005, Apr. 20-26, 2013, XP030130998, 53 pp.

Tech, et al., "3D-HEVC Draft Text 2," Joint Collaborative Team on 3D Video Coding Extension Development of ITU-T SG 16 WP 3 and ISO/IEC JTC 1/SC 29/WG 11, 6th Meeting: Geneva, CH, Oct. 25-Nov. 1, 2013, document No. JCT3V-F1001-v2 (Hereinafter, "3D-HEVC Draft Text 2"), 94 pp.

Tech, et al., "3D-HEVC Draft Text 2," (The Joint Collaborative Team on 3D Video Coding Extension Development of ISO/IEC JTC1/SC29/WG11 and ITU-T SG.16, Oct. 25-Nov. 1, 2013, Document: JCT3V-F1001-v2, 93 pp.

Tech, et al., "3D-HEVC Test Model 4," JCT-3V Meeting; Incheon, (The Joint Collaborative Team on 3D Video Coding Extension Development of ISO/IEC JTC1/SC29/WG11 and ITU-T SG.16), Apr. 20-26, 2013; No. JCT3V-D1005_v1, XP030130998, 56 pp.

Tech G., et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V- B1005_d0, 2nd Meeting: Shanghai, CN, 118 pages, XP030130414, Oct. 13-19, 2012.

Tech G., et al., "3D-HEVC Test Model 3", 3. JCT-3V Meeting; 103. MPEG Meeting; Jan. 17, 2013-Jan. 20, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-C1005, Mar. 15, 2013 (Mar. 15, 2013), 52 Pages, XP030130664, the whole document.

Tech G., et al., "3D-HEVC Test Model 4", 4. JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-D1005, Jun. 17, 2013 (Jun. 17, 2013), XP030130983, pp. 1-52, the whole document.

Tech G., et al., "3D-HEVC Test Model 4", 4. JCT-3V Meeting; Incheon; (The Joint Collaborative Team on 3D Video Coding Extension Development of ISO/IEC JTC1/SC29/WG11 and ITU-T SG.16), No. JCT3V-D1005, Jun. 17, 2013(Jun. 17, 2013), 88 Pages, XP030130998.

Tech G., et al., "MV-HEVC Draft Text 4", 4. JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-D1004, May 13, 2013 (May 13, 2013), pp. 1-50, XP030130982.

Tian, et al.,"CE1.h: Backward View Synthesis Prediction using Neighbouring Blocks", 3. JCT-3V Meeting; 103. MPEG Meeting; Jan. 17-Jan. 23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-C0152, Jan. 10, 2013, (Jan. 10, 2013), XP030130568, p. 5.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Zhang et al., "CE4: Advanced residual prediction for multiview coding," Joint Collaborative Team on 3D Video Coding extension Development of ITU-T SG6 WP 3 and ISO/IEC JTC 1/SC 29/WG 11, JCT3V-D0177, 4 Meeting: Incheon, KR, Apr. 20-26, 2013, 30 pp.

Zhang, et al., "Proposed text for JCT3V-C0049 based on 3D-HEVC Text Model 2," JCT-3V Meeting; MPEG Meeting; Jan. 17-23, 2013; Shanghai; Document: JCT3V-C0049_proposed text (The Joint Collaborative Team on 3D Video Coding Extension Development of ISO/IEC JTC1/SC29/WG11 and ITU-T SG.16); 6 pp.

Zhang L., et al., "3D-CE4: Advanced residual prediction for multiview coding," Joint Collaborative Team on 3D Video Coding Extension Development of ITU-T SG 16 WP 3 and ISO/IEC JTC 1/SC 29/WG 11, JCT3V-C0049, 3rd Meeting: Geneva, CH, Jan. 17-23, 2013, 5 pages.

Zhang L., et al., "CE4: Advanced residual prediction for multiview coding", 4. JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-D0177, XP030130841, Apr. 13, 2013 (Apr. 13, 2013), pp. 1-10.

Zhang L., et al., "CE4: Advanced Residual Prediction for Multiview Coding," Joint Collaborative Team on 3D Video Coding Extension of ITU-T SG.16 WP 3andISO/IEC JTC1/SC29/WG11, Document: JCT3V-D0177_proposed_text_r1, Apr. 20-26, 2013, 6 pp.

Tech, et al., "3D-HEVC Draft Text 3," Preliminary Version of Output Document of JCT-3V, JCT-3D Video Coding Extension Development of ITU-T SG 16 WP 3 and ISO/IEC JTC 1/SC 29/WG 11—7th Meeting: San Jose, USA Jan. 9-Jan. 17, 2014; document No. JCT3V-G1001_v1, 111 pp.

International Search Report and Written Opinion—PCT/CN2014/073039—ISA/EPO—dated Dec. 12, 2014 (12 pages).

International Preliminary Report on Patentability—PCT/CN2014/073039—ISA/EPO—dated Sep. 22, 2016 (6 pages).

"Simplification of Sub-PU based MPI," Joint Collaborative Team on 3D Video Coding Extensions of ITU-T SG 16 WP 3 and ISO/IEC JTC 1/SC 29/WG 11, JCT3V-H0133, 8th Meeting: Valencia, ES, Mar. 29-Apr. 4, 2014, 3 pages.

U.S. Appl. No. 61/840,400, filed Jun. 28, 2013.

U.S. Appl. No. 61/847,942, filed Jul. 18, 2013.

Bross B., et al., "High Efficiency Video Coding (HEVC) Text Specification Draft 10 (for FDIS & Last Call)," 12th Meeting: Geneva, CH, Jan. 14-23, 2013, Joint Collaborative Team on Video

(56) References Cited

OTHER PUBLICATIONS

Coding (JCT-VC) of ITU-T SG 16 WP 3 and ISO/IEC JTC 1/SC 29/WG 11, Document: JCTVC-L1003_v34, Mar. 19, 2013, 310 pages.
Supplementary European Search Report—EP14884610—Search Authority—Munich—dated Jan. 17, 2018 (12 pages).
Tech, et al., "3D-HEVC Test Model 4," (Joint Collaborative Team on Video Coding of ISO/IEC JTC1/SC29/WG11 and ITU-T SG.16); Document: JCT3V-D1005_v2, Apr. 20-26, 2013, 56 pp.
Yamamoto Y., et al., "3D-CE5.h: Decoupling Inter-View Candidate for AMVP", Joint Collaborative Team on 3D Video Coding Extension Development of ITU-T SG 16 WP 3 and ISO/IEC JTC 1/SC 29/WG 11 2nd Meeting: Shanghai, CN, Oct. 13-19, 2012, SW, ITU-T, Oct. 11, 2012, JCT3V-B0111, 3 Pages.

\* cited by examiner

| combIdx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| l0CandIdx | 0 | 1 | 0 | 2 | 1 | 2 | 0 | 3 | 1 | 3 | 2 | 3 | 0 | 4 | 1 | 4 | 2 | 4 | 3 | 4 |
| l1CandIdx | 1 | 0 | 2 | 0 | 2 | 1 | 3 | 0 | 3 | 1 | 3 | 2 | 4 | 0 | 4 | 1 | 4 | 2 | 4 | 3 |

FIG. 8

SIMPLIFIED SUB-PREDICTION UNIT (SUB-PU) MOTION PARAMETER INHERITANCE (MPI)

This application is a national stage entry under 35 U.S.C. § 371 of International Application No. PCT/CN2014/073039, filed Mar. 7, 2014.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure describes techniques for simplifying depth inter mode coding in a three-dimensional (3D) video coding process, such as 3D-HEVC. For example, the disclosure describes techniques for simplifying generation of a motion parameter candidate list, e.g., a merging candidate list, for a current depth prediction unit (PU). The disclosure describes techniques for simplifying motion parameter candidate list generation processes that include derivation of a sub-PU motion parameter inheritance (MPI) candidate for inclusion in the candidate list.

In one example, a method for decoding multiview video data comprises generating a motion parameter candidate list for a current depth prediction unit (PU) in a depth component of a current view of the multiview video data. The method further comprises identifying a co-located texture block to a representative block of the current depth PU, wherein a location of the co-located texture block in a texture component of the current view corresponds to a location of the representative block of the current depth PU in the depth component. The method further comprises determining that motion parameters of the co-located texture block are unavailable and, in response to the determination that motion parameters of the co-located texture block are unavailable, determining that a sub-PU motion parameter inheritance candidate is unavailable for inclusion in the motion parameter candidate list for the current depth PU. The method further comprises decoding motion information for the current depth PU based on the motion parameter candidate list for the current depth PU without the sub-PU motion parameter inheritance candidate.

In another example, a method for encoding multiview video data comprises generating a motion parameter candidate list for a current depth prediction unit (PU) in a depth component of a current view of the multiview video data. The method further comprises identifying a co-located texture block to a representative block of the current depth PU, wherein a location of the co-located texture block in a texture component of the current view corresponds to a location of the representative block of the current depth PU in the depth component. The method further comprises determining that motion parameters of the co-located texture block are unavailable and, in response to the determination that motion parameters of the co-located texture block are unavailable, determining that a sub-PU motion parameter inheritance candidate is unavailable for inclusion in the motion parameter candidate list for the current depth PU. The method further comprises encoding motion information for the current depth PU based on the motion parameter candidate list for the current depth PU without the sub-PU motion parameter inheritance candidate.

In another example, a video coding device comprises a memory storing a coded video bitstream that includes multiview video data, and one or more processors configured to generate a motion parameter candidate list for a current depth prediction unit (PU) in a depth component of a current view of the multiview video data. The one or more processors are further configured to identify a co-located texture block to a representative block of the current depth PU, wherein a location of the co-located texture block in a texture component of the current view corresponds to a location of the representative block of the current depth PU in the depth component. The one or more processors are further configured to determine that motion parameters of the co-located texture block are unavailable and, in response to the determination that motion parameters of the co-located texture block are unavailable, determine that a sub-PU motion parameter inheritance candidate is unavailable for inclusion in the motion parameter candidate list for the current depth PU. The one or more processors are further configured to code motion information for the current depth PU based on the motion parameter candidate list for the current depth PU without the sub-PU motion parameter inheritance candidate.

In another example, a video coding device for coding multiview video data comprises means for generating a motion parameter candidate list for a current depth prediction unit (PU) in a depth component of a current view of the multiview video data. The video coding device further comprises means for identifying a co-located texture block of a representative block to the current depth PU, wherein a location of the co-located texture block in a texture component of the current view corresponds to a location of the representative block of the current depth PU in the depth component. The video coding device further comprises means for determining that motion parameters of the co-located texture block are unavailable, and means for, in response to the determination that motion parameters of the co-located texture block are unavailable, determining that a sub-PU motion parameter inheritance candidate is unavailable for inclusion in the motion parameter candidate list for the current depth PU. The video coding device further comprises means for coding motion information for the current depth PU based on the motion parameter candidate list for the current depth PU without the sub-PU motion parameter inheritance candidate.

In another example, a computer-readable storage medium has instructions stored thereon that, when executed by one or more processors of a video coding device for coding multiview video data, cause the one or more processors to generate a motion parameter candidate list for a current depth prediction unit (PU) in a depth component of a current view of the multiview video data. The instructions further cause the one or more processors to identify a co-located texture block to a representative block of the current depth PU, wherein a location of the co-located texture block in a texture component of the current view corresponds to a location of the representative block of the current depth PU in the depth component. The instructions further cause the one or more processors to determine that motion parameters of the co-located texture block are unavailable and, in response to the determination that motion parameters of the co-located texture block are unavailable, determine that a sub-PU motion parameter inheritance candidate is unavailable for inclusion in the motion parameter candidate list for the current depth PU. The instructions further cause the one or more processors to code motion information for the current depth PU based on the motion parameter candidate list for the current depth PU without the sub-PU motion parameter inheritance candidate.

In another example, a method for decoding multiview video data comprises generating a motion parameter candidate list for a current depth prediction unit (PU) in a depth component of a current view of the multiview video data. The method further comprises deriving a sub-PU motion parameter inheritance candidate for inclusion in the motion parameter candidate list for the current depth PU only if a partition mode of the current depth PU is 2N×2N, and decoding the current depth PU based on the motion parameter candidate list for the current depth PU.

In another example, a method for encoding multiview video data comprises generating a motion parameter candidate list for a current depth prediction unit (PU) in a depth component of a current view of the multiview video data. The method further comprises deriving a sub-PU motion parameter inheritance candidate for inclusion in the motion parameter candidate list for the current depth PU only if a partition mode of the current depth PU is 2N×2N, and encoding the current depth PU based on the motion parameter candidate list for the current depth PU.

In another example, a video coding device comprises a memory storing a coded video bitstream that includes multiview video data, and one or more processors configured to generate a motion parameter candidate list for a current depth prediction unit (PU) in a depth component of a current view of the multiview video data. The one or more processors are further configured to derive a sub-PU motion parameter inheritance candidate for inclusion in the motion parameter candidate list for the current depth PU only if a partition mode of the current depth PU is 2N×2N, and code the current depth PU based on the motion parameter candidate list for the current depth PU.

In another example, a video coding device for coding multiview video data comprises means for generating a motion parameter candidate list for a current depth prediction unit (PU) in a depth component of a current view of the multiview video data, means for deriving a sub-PU motion parameter inheritance candidate for inclusion in the motion parameter candidate list for the current depth PU only if a partition mode of the current depth PU is 2N×2N, and means for decoding the current depth PU based on the motion parameter candidate list for the current depth PU.

In another example, a computer-readable storage medium has instructions stored thereon that, when executed by one or more processors of a video coding device for coding multiview video data, cause the one or more processors to generate a motion parameter candidate list for a current depth prediction unit (PU) in a depth component of a current view of the multiview video data, derive a sub-PU motion parameter inheritance candidate for inclusion in the motion parameter candidate list for the current depth PU only if a partition mode of the current depth PU is 2N×2N, and decode the current depth PU based on the motion parameter candidate list for the current depth PU.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 8 is a table indicating an example specification of l0CandIdx and l1CandIdx in 3D-HEVC.

DETAILED DESCRIPTION

Figure 1:
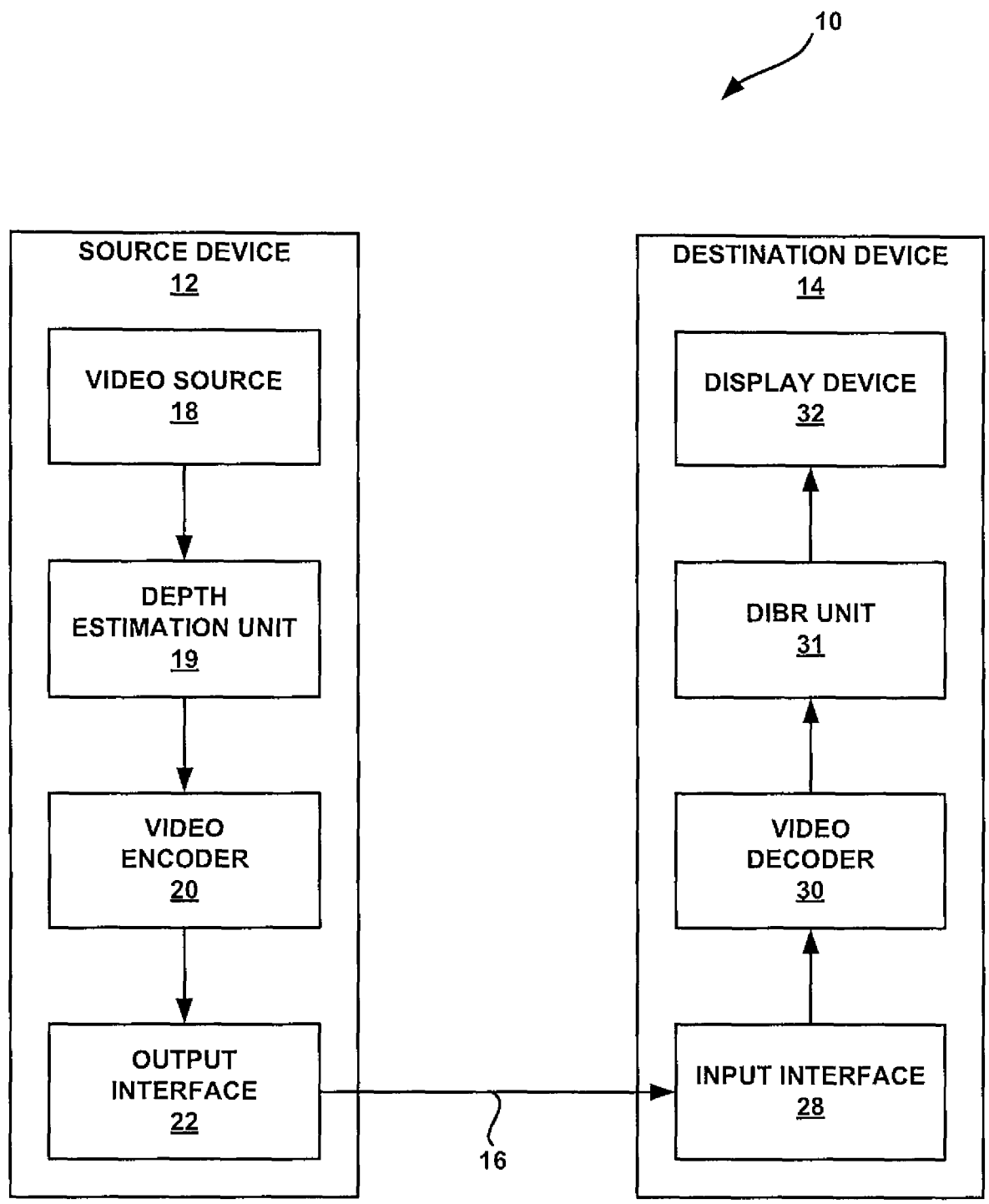
FIG. 1 is a block diagram illustrating an example video coding system that may utilize the techniques described in this disclosure.

The techniques described in this disclosure are generally related to three-dimensional (3D) video coding, e.g., the coding of two or more views. More particularly, the techniques are related to 3D video coding using a multiview coding process, such as a multiview plus depth process. In some examples, the techniques of this disclosure relate to inter prediction coding of the depth components of multiview video data included in a coded video bitstream.

High-Efficiency Video Coding (HEVC) is a newly-developed video coding standard. A recent draft of the HEVC standard, referred to as "HEVC Draft 10" is described in Bross et al., "High Efficiency Video Coding (HEVC) text specification draft 10 (for FDIS & Last Call)," Document: JCTVC-L1003_v34, Joint Collaborative Team on Video Coding (JCT-VC) of ITU-T SG16 WP3 and ISO/IEC JTC1/SC29/WG11, 12$^{th}$ Meeting, Geneva, Switzerland, 14-23 Jan. 2013, and is available from: http://phenix.int-evry.fr/jct/doc_end_user/documents/12_Geneva/wg11/JCTVC-L1003-v34.zip. HEVC Draft 10 is incorporated herein by reference in its entirety.

In JCT-3V, two HEVC extensions, the multiview extension (MV-HEVC) and 3D video extension (3D-HEVC) are being developed. 3D-HEVC is an extension of HEVC for 3D video data. A recent software description as well as the working draft of 3D-HEVC is described in Gerhard Tech, "3D-HEVC Draft Text 3," Document: JCT3V-G1001-v1, Joint Collaborative Team on 3D Video Coding Extension Development (JCT-3V) of ITU-T SG16 WP3 and ISO/IEC JTC1/SC29/WG11, 7$^{th}$ Meeting, San Jose, USA, 9-17 Jan. 2014, and is available from: http://phenix.it-sudparis.eu/jct2/doc_end_user/documents/7_San %20Jose/wg11/JCT3V-G1001-v1.zip. A recent reference software "3D-HTM version 9.0" for 3D-HEVC can be downloaded from the following link: https://hevc.hhi.fraunhofer.de/svn/svn_3DVCSoftware/tags/HTM-10.0rc1/. The 3D-HEVC Draft Text 3 and 3D-HTM version 9.0 are incorporated herein by reference in their entireties.

3D-HEVC provides for multiple views of the same scene from different viewpoints. Part of the standardization efforts for 3D-HEVC includes the standardization of the multiview video codec based on HEVC. The techniques of this disclosure may be applied to a 3D-HEVC encoder-decoder (codec) in which multiview plus depth coding processes are used.

In general, a multiview or 3D video sequence may include, for each access unit (i.e., with the same time instance), two or more pictures for each of two or more views, respectively. It should be understood that two or more pictures may have the same time instance for purposes of defining an access unit, even in cases where the pictures are, in reality, displayed at different times. For instance, pictures may be displayed at different times when using active glasses that synchronize lens shuttering with a stereoscopic display, which rapidly alternates display of pictures of different views. Nevertheless, such pictures of different views may be defined as having the same time instance, and thus, included in a common access unit. Inter-view prediction may be allowed among pictures that are from different views, but in the same access unit or time instance. In addition, for each access unit, each view may include both a texture picture (texture component) and a corresponding depth picture (depth component). In 3D-HEVC, each access unit contains multiple pictures, and pictures in each view have a unique view id, or view order index. However, the depth picture and texture picture of the same view may have different layer ids.

In 3D-HEVC, inter-view motion prediction based on the reconstructed view components from different views is enabled to improve coding efficiency. In 3D-HEVC, inter-view motion prediction is similar to the motion compensation used in standard HEVC, and may utilize the same or similar syntax elements. When a video coder performs inter-view motion prediction on a prediction unit (PU), the video coder may use, as a source of motion information, a picture that is in the same access unit as the PU, but in a different view. In contrast, conventional motion compensation only uses pictures in different access units as reference pictures. Thus, in 3D-HEVC, the motion parameters of a block in a dependent view may be predicted or inferred based on already-coded motion parameters in other views of the same access unit.

The techniques described in this disclosure are also related to constructing a list of motion parameter candidates for a current block of video data according to a motion parameter prediction mode, such as a merge mode, skip mode, or Advanced Motion Vector Prediction (AMVP) mode. When a video coder performs motion parameter prediction for a current block of video data, the video coder may generate a motion parameter candidate list, e.g., a merging candidate list or an AMVP candidate list. Both the video encoder and the video decoder construct the motion parameter candidate list in the same defined manner. If a candidate is selected from the list of motion parameter candidates, then the video coder may use motion parameters associated with the selected candidate to encode/decode a current video block. For such motion parameter prediction modes, a video encoder may signal, in an encoded bitstream of video data, an index value identifying the motion information candidate selected from the motion information candidate list constructed by the video encoder according to the defined process. Based on the index, the video decoder can identify the selected motion parameter candidate from the motion parameter candidate list constructed by the video decoder according to the defined process for decoding the current video block.

Merge mode is a video coding mode in which motion parameters (such as motion vectors, reference frame indexes, prediction directions, or other parameters) of a merging candidate are inherited for a current video block being coded. A skip mode, in which residual information is not coded, also utilizes the same merging candidate list construction process as used for merge mode. Accordingly, the motion parameter candidate, e.g., merging candidate, list construction techniques described herein may be applicable or a merge mode, a skip mode, or generally a merge/skip motion information prediction mode, which may be a merge mode and/or a skip mode.

In the merge and/or skip motion information prediction mode, both a video encoder and a video decoder construct a merging list of motion information candidates for a current video block (e.g., candidate motion parameters, such as reference pictures and motion vectors, for coding the current video block). The candidates in the list may include spatial merging candidates (SMCs) derived from the motion information of spatial neighboring blocks, and a temporal merging candidate (TMC) derived from the motion information of a temporal neighboring block (from a reference picture at a different time instance than the current picture of the current video block). The candidates in the merging candidate list may also include combined bi-predictive merging candidates, and zero motion vector merging candidates. A video encoder signals the chosen motion information used to encode the current video block (i.e., the chosen candidate from the merging candidate list) by signaling an index into the candidate list. For the merge mode, once a video decoder decodes the index into the candidate list, all motion parameters of the indicated candidate are inherited by the current video block, and may be used by the video decoder to decode the current video block.

Video coders may also implement an AMVP mode that, similar to merge mode, includes expressing motion vectors as an index selecting one of a plurality of motion parameter candidates stored in a list of motion parameter candidates constructed in a defined manner. In AMVP mode, like the merge mode, the motion vectors of reference blocks, e.g., spatially- and/or temporally-neighboring blocks, are used by video coders as motion parameter candidates. However, for AMVP mode, a video encoder determines a motion vector difference (MVD) between a desired motion vector for coding the video block and the motion vector indicated by the motion information candidate selected from the motion parameter candidate list. In addition to the index into the motion parameter candidate list and the MVD, video coders employing the AMVP mode may also signal in the coded bitstream a reference picture index, and an inter-prediction direction for coding a particular video block according to the AMVP mode.

To implement inter-view motion prediction for a multiview or 3D video sequence, e.g., in 3D-HEVC, the candidate list may include an inter-view predicted motion vector candidate (IPMVC) in merging candidate lists and AMVP candidate lists. The video coder may use an IPMVC in the same manner as other candidates in a candidate list. An IPMVC specifies the motion parameters of a PU (i.e., a reference PU) of a disparity reference picture. The disparity reference picture may be in the same access unit as a current PU, but in a different view than the current PU. To determine a reference PU in a disparity reference picture, the video coder may perform a disparity vector construction process to determine a disparity vector for the current PU. The disparity vector for the current PU may indicate a horizontal spatial displacement between a prediction block of the current PU and a location within the disparity reference picture. The reference PU may be a PU of the disparity reference picture that covers the location indicated by the disparity vector.

To improve the depth coding efficiency, besides the merge candidates in specified HEVC, a sub-PU motion parameter inheritance (MPI) candidate, inter-view motion prediction candidate, e.g., IPMVC, and derived depth coding (DDD) candidate are introduced in skip/merge mode coding of depth blocks, e.g., for 3D-HEVC. The basic idea of the MPI candidate, e.g., sub-PU MPI candidate, is to exploit the similarity of the motion characteristics between the texture images and its associated depth images. The inter-view motion prediction candidate may exploit the similarity of the motion characteristics between adjacent views. The DDD candidate may exploit the correlation between disparity vector and depth value.

The techniques described in this disclosure generally relate to depth coding and, more particularly, relate to construction of a motion parameter candidate list, e.g., merge candidate list, for coding a current depth PU. In some examples, the described techniques include determining that a sub-PU motion parameter inheritance (MPI) motion parameter candidate is unavailable for inclusion in the motion parameter candidate list for the current depth PU if motion parameters of a co-located texture block of a representative block of the current depth PU are unavailable. In some examples, the described techniques include deriving a sub-PU MPI candidate for inclusion in the motion parameter candidate list for the current depth PU only if a partition mode of the current depth PU is 2N×2N. For other partition modes, the techniques may include adding a PU MPI candidate to the list in place of the sub-PU MPI candidate.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In some examples, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the internet). The one or more communication media may include routers, switches, base stations, or other equipment that facilitate communication from source device 12 to destination device 14.

In some examples, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In some examples, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, depth estimation unit 19, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, depth image based rendering (DIBR) unit 31, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Video source 18 may provide multiple views of video data to video encoder 20. For example, video source 18 may correspond to an array of cameras, each having a unique horizontal position relative to a particular scene being filmed. Alternatively, video source 18 may generate video data from disparate horizontal camera perspectives, e.g., using computer graphics. Depth estimation unit 19 may be configured to determine values for depth pixels corresponding to pixels in a texture image. For example, depth estimation unit 19 may represent a Sound Navigation and Ranging (SONAR) unit, a Light Detection and Ranging (LIDAR) unit, or other unit capable of directly determining depth values substantially simultaneously while recording video data of a scene.

Additionally or alternatively, depth estimation unit 19 may be configured to calculate depth values indirectly by comparing two or more images that were captured at substantially the same time from different horizontal camera perspectives. By calculating horizontal disparity between substantially similar pixel values in the images, depth estimation unit 19 may approximate depth of various objects in the scene. Depth estimation unit 19 may be functionally integrated with video source 18, in some examples. For example, when video source 18 generates computer graphics images, depth estimation unit 19 may provide actual depth maps for graphical objects, e.g., using z-coordinates of pixels and objects used to render texture images.

In some examples, display device 32 may comprise a device capable of displaying two or more views simultaneously or substantially simultaneously, e.g., to produce a 3D visual effect for a viewer. DIBR unit 31 of destination device 14 may render synthesized views using texture and depth information of decoded views received from video decoder 30. For example, DIBR unit 31 may determine horizontal disparity for pixel data of texture images as a function of values of pixels in corresponding depth maps. DIBR unit 31 may then generate a synthesized image by offsetting pixels in a texture image left or right by the determined horizontal disparity. In this manner, display device 32 may display one or more views, which may correspond to decoded views and/or synthesized views, in any combination. In accordance with the techniques of this disclosure, video decoder 30 may provide original and updated precision values for depth ranges and camera parameters to DIBR unit 31, which may use the depth ranges and camera parameters to properly synthesize views.

Many of the techniques described in this disclosure can be performed by both video encoder 20 and video decoder 30. Therefore, for ease of explanation, the techniques may be described with respect to a video coder, which may be a video encoder and/or a video decoder, such as video encoder 20 and video decoder 30. This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any bitstream conforming to the MVC-based 3DV extension of H.264/AVC always contains a sub-bitstream that is compliant to the MVC extension of H.264/AVC. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, and ITU-T H.264, ISO/IEC Visual. In other examples, video encoder 20 and video decoder 30 may operate according to the HEVC standard, the multi-view video coding extension of HEVC (MV-HEVC), and/or the 3D video coding extension of HEVC (3D-HEVC), discussed above.

In HEVC and other video coding specifications, a video sequence typically includes a series of pictures. Pictures may also be referred to as "frames." A picture may include three sample arrays, denoted SL, Scb, and Scr. SL is a two-dimensional array (i.e., a block) of luma samples. Scb is a two-dimensional array of Cb chrominance samples. Scr is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the prediction block of the PU and the second reference location.

Typically a reference picture list construction for the first or the second reference picture list (e.g., RefPicList0 or RefPicList1) of a B picture includes two steps: reference picture list initialization and reference picture list reordering (modification). The reference picture list initialization is an explicit mechanism that puts the reference pictures in the reference picture memory (also known as decoded picture buffer) into a list based on the order of POC (Picture Order Count, aligned with display order of a picture) values. The reference picture list reordering mechanism can modify the position of a picture that was put in the list during the reference picture list initialization to any new position, or put any reference picture in the reference picture memory in any position even the picture doesn't belong to the initialized list. Some pictures after the reference picture list reordering (modification) may be put in a very further position in the list. However, if a position of a picture exceeds the number of active reference pictures of the list, the picture is not considered as an entry of the final reference picture list. The number of active reference pictures may be signaled in the slice header for each list. After reference picture lists are constructed (namely RefPicList0 and RefPicList1, if available), a reference index to a reference picture list can be used to identify any reference picture included in the reference picture list.

After video encoder 20 generates predictive luma, Cb, and Cr blocks for one or more PUs of a CU, video encoder 20 may generate a luma residual block for the CU. Each sample in the luma residual block of the CU indicates a difference between a luma sample in one of the predictive luma blocks of the CU and a corresponding sample in the original luma coding block of the CU. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 may signal the motion parameters of a PU (for inter prediction) using merge mode or advanced motion vector prediction (AMVP) mode. In other words, in HEVC, there are modes for the prediction of motion parameters, including the merge mode and AMVP. Motion parameter prediction may comprise the determination of motion parameters of a video unit (e.g., a PU) based on motion parameters of one or more other video units. The motion parameters of a PU may include motion vector(s) of the PU and reference index(s) of the PU.

When video encoder 20 signals the motion parameters of a current PU using merge mode, video encoder 20 generates a merge candidate list. In other words, video encoder 20 may perform a merge candidate list construction process. The merge candidate list includes a set of merge candidates that indicate the motion parameters of PUs that spatially or temporally neighbor the current PU. That is, in the merge mode, a candidate list of motion parameters (e.g., reference indexes, motion vectors, etc.) is constructed where a candidate can be from reference blocks, e.g., spatial and temporal neighboring blocks.

Furthermore, in merge mode, video encoder 20 may select a merge candidate from the merge candidate list and may use the motion parameters indicated by the selected merge candidate as the motion parameters of the current PU. Video encoder 20 may signal the position in the merge candidate list of the selected merge candidate. For instance, video encoder 20 may signal the selected motion parameters by transmitting an index into the candidate list. Video decoder 30 may obtain, from the bitstream, the index into the candidate list (i.e., a candidate list index). In addition, video decoder 30 may generate the same merge candidate list using the same list construction processor as the video encoder, and may determine, based on the indication of the position of the selected merge candidate, the selected merge candidate. Video decoder 30 may then use the motion information of the selected merge candidate to generate predictive blocks for the current PU. That is, video decoder 30 may determine, based at least in part on the merge candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion parameters of a current PU using skip mode, video encoder 20 does not signal any residual data for the current PU. Accordingly, video decoder 30 may determine, without use of residual data, a predictive block for the PU based on a reference block indicated by the motion parameters of a selected candidate in the merge candidate list.

AMVP mode is similar to merge mode in that video encoder 20 may generate a candidate list and may select a candidate from the candidate list. However, when video encoder 20 signals the RefPicListX motion information of a current PU using AMVP mode, video encoder 20 may signal a RefPicListX motion vector difference (MVD) for the current PU and a RefPicListX reference index for the current PU in addition to signaling a RefPicListX MVP flag for the current PU. The RefPicListX MVP flag for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX motion vector predictor (MVP) flag, a RefPicListX reference index value, and a RefPicListX MVD. In other words, the data in the bitstream representing the motion vector for the current PU may include data representing a reference index, an index to a candidate list, and an MVD.

Furthermore, when video encoder 20 signals the motion parameters of a current PU using AMVP mode, video decoder 30 may obtain, from the bitstream, a MVD for a current PU and a MVP flag. Video decoder 30 may generate the same AMVP candidate list using the same list construction process as the video encoder, and may determine, based on the MVP flag, the selected AMVP candidate. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

Figure 2:
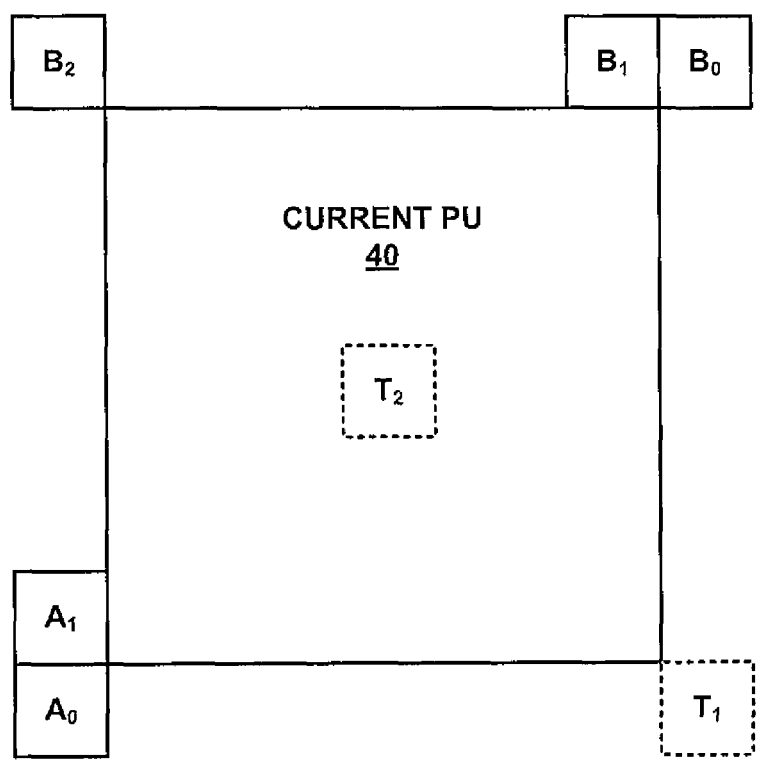
FIG. 2 is a conceptual diagram illustrating example spatially-neighboring and temporally-neighboring blocks.

FIG. 2 is a conceptual diagram illustrating example spatially-neighboring and temporally-neighboring PUs relative to a current PU 40. When video decoder 30 generates a motion parameter candidate list for a current PU, video decoder 30 may derive one or more motion parameter candidates based on the motion parameters of spatially-neighboring PUs that cover locations that spatially neighbor the current PU. In the example of FIG. 2, the spatially-neighboring PUs may be PUs that cover the locations indicated as $A_0$, $A_1$, $B_0$, $B_1$, and $B_2$. A PU may cover a location when a prediction block of the PU includes the location.

A video coder may also include a candidate in a merge candidate list or an AMVP candidate list that is based on the motion information of a PU that temporally neighbors a current PU (i.e., a PU that is in a different time instance, and thus access unit, than the current PU). For merging candidate list construction, such a temporal motion parameter candidate may be referred to as a temporal merging candidate (TMC). In order to derive a TMC, a video coder may need to access the motion vector of a picture from a different access unit in a reference picture list.

To determine a TMC, a video coder may identify a reference picture that includes a PU that is co-located with the current PU. In other words, the video coder may identify a co-located picture. If the current slice of the current picture is a B slice (i.e., a slice that is allowed to include bi-directionally inter predicted PUs), video encoder 20 may signal, in a slice header, a syntax element (e.g., collocated_from_10_flag) that indicates whether the co-located picture is from RefPicList0 or RefPicList1. In other words, when the use of TMVPs is enabled for a current slice, and the current slice is a B slice (e.g., a slice that is allowed to include bi-directionally inter predicted PUs), video encoder 20 may signal a syntax element (e.g., collocated_from_10_flag) in a slice header to indicate whether the co-located picture is in RefPicList0 or RefPicList1.

After video decoder 30 identifies the reference picture list that includes the co-located picture, video decoder 30 may use another syntax element (e.g., collocated_ref_idx), which may be signaled in a slice header, to identify a picture (i.e., the co-located picture) in the identified reference picture list. That is, after a reference picture list is identified, collocated_ref_idx, signaled in a slice header is used to identify the picture in the reference picture list.

The video coder may identify a co-located PU by checking the co-located picture. The TMC may indicate either the motion parameters of a right-bottom PU of the CU containing the co-located PU, illustrated by block $T_1$ in FIG. 2, or the motion parameters of the right-bottom PU within the center PUs of the CU containing this PU, illustrated by block $T_2$ in FIG. 2. Thus, either the motion of the right-bottom PU of the CU containing this PU, or the motion of the right-bottom PU within the center PUs of the CU containing this PU is used. In FIG. 2, the positions of blocks $T_1$ and $T_2$ illustrate how they are co-located with current PU 40, while they have a dashed border to illustrate that they are not located in a different temporal reference picture (in a different access unit) then current PU 40.

The right-bottom PU of the CU containing the co-located PU (e.g., block $T_1$ in FIG. 2) may be a PU that covers a location immediately below and right of a bottom-right sample of a prediction block of the PU. The right-bottom PU within the center PUs of the CU containing the co-located PU (e.g., block $T_2$ in FIG. 2) may be a PU that covers a location that covers a location at or near the center of the current PU. In other words, the TMC may indicate the motion information of a PU that is in the reference picture and that covers a location that is co-located with a bottom right corner of the current PU, or the TMVP may indicate the motion information of a PU that is in the reference picture and that covers a location that is co-located with a center of the current PU.

When motion vectors identified by the above process (i.e., motion vectors of a TMC) are used to generate a motion candidate for merge mode or AMVP mode, the video coder may scale the motion vectors based on the temporal location (reflected by POC value). For instance, a video coder may increase the magnitude of a motion vector by greater amounts when a difference between the POC values of a current picture and a reference picture is greater than when a difference between the POC values of the current picture and the reference picture is less.

In multiview coding, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

Multiview coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multiview coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

Figure 3:
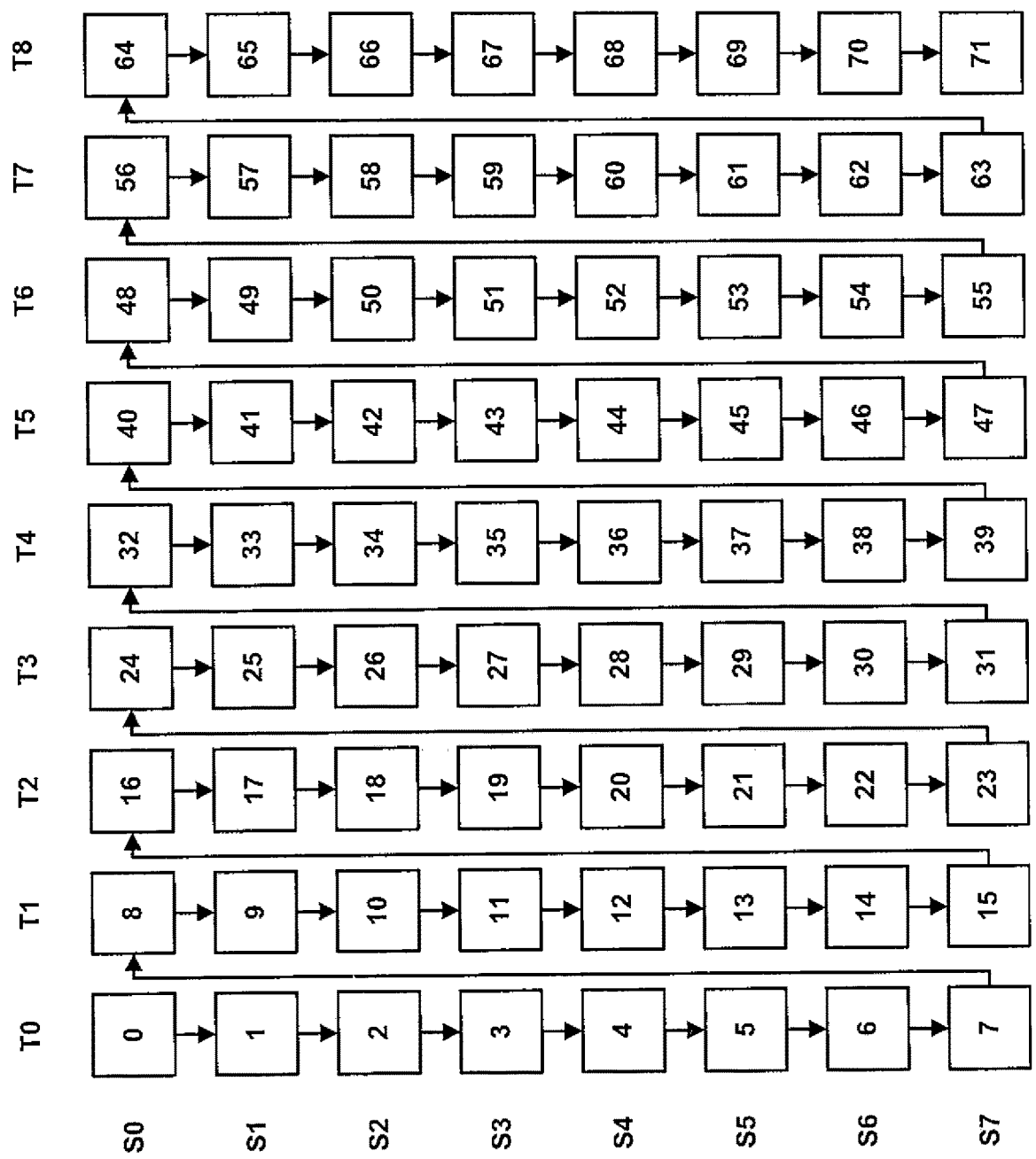
FIG. 3 is a conceptual diagram illustrating an example multiview decoding order.

FIG. 3 is a conceptual diagram illustrating an example multiview decoding order. The multiview decoding order may be a bitstream order. In the example of FIG. 3, each square corresponds to a view component. Columns of squares correspond to access units. Each access unit may be defined to contain the coded pictures of all the views of a time instance. Rows of squares correspond to views. In the example of FIG. 3, the access units are labeled T0 . . . T8 and the views are labeled S0 . . . S7. Again, it should be understood that pictures in an access unit may in reality be displayed at the same time or at different times, based on the type of 3D display being used. An autostereoscopic display or a stereoscopic display that is associated with passive filtering glasses may display each of the pictures (view components) of a common access unit, e.g., pictures 0-7 of access unit T0, at the same time, whereas a stereoscopic display that is associated with active glasses may display each of the pictures at different times. Because each view component of an access unit is decoded before any view component of the next access unit, the decoding order of FIG. 3 may be referred to as time-first coding. The decoding order of access units may not be identical to the output or display order of the views.

Multiview coding may support inter-view prediction. Inter-view prediction is similar to temporal inter prediction used in H.264/AVC, HEVC, or other video coding specifications, and may use the same syntax elements. However, when a video coder performs inter-view prediction on a current video unit (such as a macroblock or PU), the video coder may use, as a reference picture, a picture that is in the same access unit as the current video unit, but in a different view. In contrast, conventional temporal inter prediction only uses pictures in different access units of the same view as reference pictures.

In multiview coding, a view may be referred to as a "base view" if a video decoder (e.g., video decoder 30) can decode pictures in the view without reference to pictures in any other view. When coding a picture in a non-base view, a video coder may add a picture into a reference picture list (e.g., RefPicList0 or RefPicList1) if the picture is in a different view but within a same time instance (i.e., access unit) as the picture that the video coder is currently coding. Like other inter prediction reference pictures, the video coder may insert an inter-view prediction reference picture at any position of a reference picture list.

Figure 4:
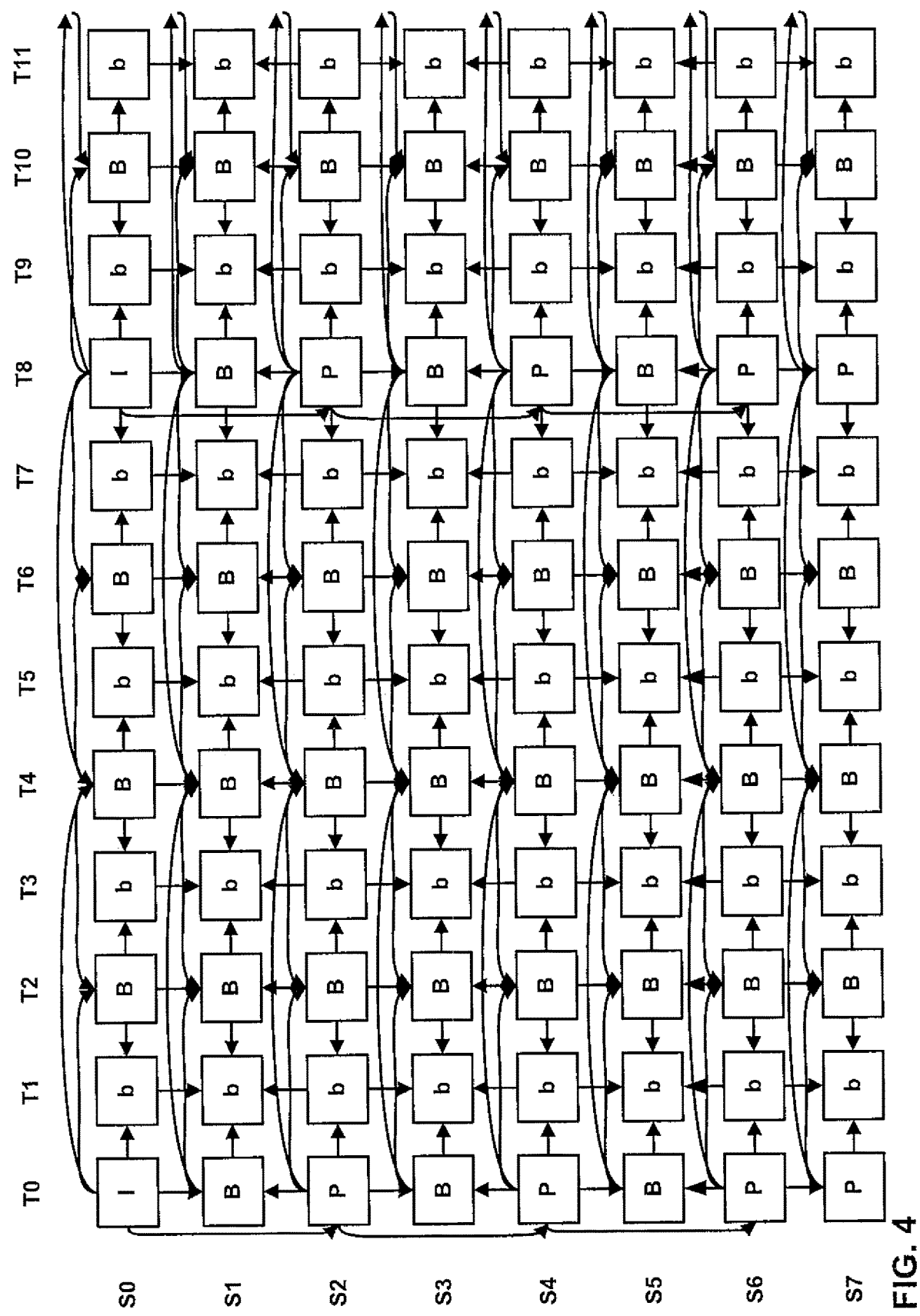
FIG. 4 is a conceptual diagram illustrating an example prediction structure for multiview coding.

FIG. 4 is a conceptual diagram illustrating an example prediction structure for multiview coding. The multiview prediction structure of FIG. 4 includes temporal and inter-view prediction. In the example of FIG. 4, each square corresponds to a view component. In the example of FIG. 4, the access units are labeled T0 . . . T11 and the views are labeled S0 . . . S7. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction (either temporal inter-prediction or inter-view prediction) as a reference picture for the second square. As indicated by the vertical arrows in FIG. 4, view components in different views of the same access unit may be available as reference pictures. The use of one view component of an access unit as a reference picture for another view component of the same access unit may be referred to as inter-view prediction.

In multiview coding, inter-view prediction may be performed among pictures in different views of the same access unit (i.e., with the same time instance) to remove correlation between views. When coding a picture in one of the non-base views, a picture may be added into a reference picture list, if the picture is in a different view but with a same time instance. An inter-view prediction reference picture can be put in any position of a reference picture list, just like any inter prediction reference picture.

In the context of multiview video coding, there are two kinds of motion vectors. One kind of motion vector is a normal motion vector that points to a temporal reference picture. The type of inter prediction corresponding to a normal, temporal motion vector may be referred to as motion-compensated prediction (MCP). When an inter-view prediction reference picture is used for motion compensation, the corresponding motion vector is referred to as a "disparity motion vector." In other words, a disparity motion vector points to a picture in a different view (i.e., an inter-view reference picture). The type of inter prediction corresponding to a disparity motion vector may be referred to as "disparity-compensated prediction" or "DCP."

As mentioned above, a 3DV extension of HEVC (i.e., 3D-HEVC) is under development. 3D-HEVC may improve coding efficiency using inter-view motion prediction. In inter-view motion prediction, a video coder may determine (i.e., predict) the motion information of a current PU based on the motion information of a PU in a different view than (but within the same access unit as) the current PU. To enable inter-view motion prediction, a video coder may determine disparity vectors for video units (e.g., PUs, CUs, etc.). In general, a disparity vector is used as an estimator of the displacement between two views. A video coder may use a disparity vector for a video unit either to locate a reference block in another view for inter-view motion prediction, or the video coder may convert the disparity vector to a disparity motion vector for inter-view motion prediction. That is, the disparity vector may be used either to locate the corresponding block in the other view for inter-view motion prediction or be converted to a disparity motion vector for inter-view motion prediction.

An implicit disparity vector (IDV) is a disparity vector of a spatially- or temporally-neighboring PU that is coded using inter-view prediction. An IDV may be generated when a PU employs inter-view motion parameter prediction, e.g., the candidate for AMVP or merge modes is derived from a reference block in the other view with the help of a disparity vector. Such a disparity vector is referred to as an IDV. An IDV may be stored to the PU for the purpose of disparity vector derivation.

In inter-mode depth coding, an IDV is derived by converting a depth value, e.g., depth value 128, to the disparity between current depth view and the reference depth view directly. Depth value 128 refers to a specific depth value, i.e., the middle depth value, assuming the depth value is to be represented by eight bits and the depth value can range from 0 to 255. Conversion from depth value to disparity may be as follows.

For each reference view of the current view, a set of camera parameters vps_cp_scale, vps_cp_off, vps_cp_inv_scale_plus_scale, and vps_cp_inv_off_plus_off are coded in the video parameter set (VPS), or a set of camera parameters cp_scale, cp_off, cp_inv_scale_plus_scale, and cp_inv_off_plus_off are coded in slice segment header. The syntax for the set of camera parameters vps_cp_scale, vps_cp_off, vps_cp_inv_scale_plus_scale, and vps_cp_inv_off_plus_off is shown in Table 1, below. Semantics for the set of camera parameters included in Table 1 follows Table 1. The syntax for set of camera parameters cp_scale, cp_off, cp_inv_scale_plus_scale, and cp_inv_off_plus_off are shown in Table 2, below. Semantics for the set of camera parameters included in Table 2 follows Table 2. These camera parameters can be used to convert depth value to disparity between the current view and the reference view.

TABLE 1

Video parameter set extension 2 syntax

| vps_extension2( ) { | Descriptor |
|---|---|
| ... | |
|   cp_precision | ue(v) |
|   for( i = 0; i < NumViews; i++ ) { | |
|     cp_present_flag[ i ] | u(1) |
|     if( cp_present_flag[ i ] ) { | |
|       cp_in_slice_segment_header_flag[ i ] | u(1) |
|       if( !cp_in_slice_segment_header_flag[ i ] ) | |
|         for( j = 0; j < i; j++ ) { | |
|           vps_cp_scale[ i ][ j ] | se(v) |
|           vps_cp_off[ i ][ j ] | se(v) |
|           vps_cp_inv_scale_plus_scale[ i ][ j ] | se(v) |
|           vps_cp_inv_off_plus_off[ i ][ j ] | se(v) |
|         } | |
|     } | |
|   } | |
| ... | |

Video Parameter Set Extension 2 Semantics cp_precision specifies the precision of vps_cp_scale[i][j], vps_cp_off[i][j], vps_cp_inv_scale_plus_scale[i][j], and vps_cp_inv_off_plus_off[i][j] in the VPS and cp_scale[j], cp_off[j], cp_inv_scale_plus_scale[j], and cp_inv_off_plus_off[j] in the slice segment header. The value of cp_precision shall be in the range of 0 to 5, inclusive.

cp_present_flag[i] equal to 1 specifies that the syntax elements vps_cp_scale[i][j], vps_cp_off[i][j], vps_cp_inv_scale_plus_scale[i][j], and vps_cp_inv_off_plus_off[i][j] are present in the VPS or that cp_scale[j], cp_off[j]. cp_inv_scale_plus_scale[j], and cp_inv_off_plus_off[j] are present in slice segment headers with nuh_layer_id equal to layerId and VpsViewIdx[layerId] equal to i. cp_present_flag[i] equal to 1 indicates that camera parameters are not present. For layerId in the range of 0 to MaxLayersMinus1, inclusive, the following applies:

$$cpRequiredFlag[layerId]=depth\_refinement\_flag[layerId]\|view\_synthesis\_pred\_flag[layerId]\|(iv\_m\_v\_pred\_flag[layerId]\ \&\&\ VpsDepthFlag[layerId]) \quad (H\text{-}7)$$

When, for any value of layerId, cpRequiredFlag[layerId] is equal to 1, the value of cp_present_flag[VpsViewIdx[layerId] ] shall be equal to 1. When not present, the value of cp_present_flag[i] is inferred to be equal to 0.

cp_in_slice_segment_header_flag[i] equal to 1 specifies that the syntax elements vps_cp_scale[i][j], vps_cp_off[i][j], vps_cp_inv_scale_plus_scale[i][j], and vps_cp_inv_off_plus_off[i][j] are not present in the VPS and that the syntax elements cp_scale[j], cp_off[j], cp_inv_scale_plus_scale[j], and cp_inv_off_plus_off[j] are present in slice segment headers with nuh_layer_id equal to layerId and VpsViewIdx [layerId] equal to i. cp_in_slice_segment_header_flag equal to 0 specifies that the vps_cp_scale[i][j], vps_cp_off[i][j], vps_cp_inv_scale_plus_scale[i][j], and vps_cp_inv_off_plus_off[i][j] syntax elements are present in the VPS and that the syntax elements cp_scale[j], cp_off[j], cp_inv_scale_plus_scale[j], and cp_inv_off_plus_off[j] are not present in slice segment headers with nuh_layer_id equal to layerId and VpsViewIdx[layerId] equal to i. When not present, the value of cp_in_slice_segment_header_flag[i] is inferred to be equal to 0.

vps_cp_scale[i][j], vps_cp_off[i][j], vps_cp_inv_scale_plus_scale[i][j], and vps_cp_inv_off_plus_off[i][j] specify conversion parameters for converting a depth value to a disparity value and might be used to infer the values of cp_scale[j], cp_off[j], cp_inv_scale_plus_scale[j], and cp_inv_off_plus_off[j] for the i-th view specified in VPS. When the i-th view contains both a texture view and a depth view, the conversion parameters are associated with the texture view.

TABLE 2

General slice segment header syntax

| slice_segment_header( ) { | Descriptor |
|---|---|
| ... | |
|   if( nuh_layer_id > 0 && | |
|   cp_in_slice_segment_header_flag[ ViewIdx ] ) | |
|     for ( j = 0; j < ViewIdx; j++ ) { | |
|       cp_scale[ j ] | se(v) |
|       cp_off[ j ] | se(v) |
|       cp_inv_scale_plus_scale[ j ] | se(v) |
|       cp_inv_off_plus_off[ j ] | se(v) |
|     } | |
| ... | |

General Slice Segment Header Semantics

. . .

cp_scale[j], cp_off[j], cp_inv_scale_plus_scale[j], and cp_inv_off_plus_off[j] specify conversion parameters for converting a depth value to a disparity value. When not present, the values of cp_scale[j], cp_off[j], cp_inv_scale_plus_scale[j], and cp_inv_off_plus_off[j], are inferred to be equal to vps_cp_scale[ViewIdx][j], vps_cp_off[ViewIdx][j], vps_cp_inv_scale_plus_scale[ViewIdx][j], and vps_cp_inv_off_plus_off[ViewIdx][j], respectively. It is a requirement of bitstream conformance, that the values of cp_scale[j], cp_off[j], cp_inv_scale_plus_scale[j], and cp_inv_off_plus_off[j] in a slice segment header having a ViewIdx equal to viewIdxA and the values of cp_scale[j], cp_off[j], cp_inv_scale_plus_scale[j], and cp_inv_off_plus_off[j] in a slice segment header having a ViewIdx equal to viewIdxB shall be the same, when viewIdxA is equal to viewIdxB.

The array DepthToDisparityB[j][d] specifying the disparity between the current view and the view with ViewIdx equal j corresponding to the depth value d in the view with ViewIdx equal to j and the array DepthToDisparityF[j][d] specifying the disparity between the view with ViewIdx equal j and the current view corresponding to the depth value d in the current view is derived as specified in the following:

The variable log 2 Div is set equal to $BitDepth_Y-1+cp\_precision$.

For d in range of 0 to $((1<<BitDepth_Y)-1)$, inclusive, the following applies:

For i in the range of 0 to ViewIdx−1, inclusive, the following applies:

$$\text{offset}=(cp\_off[j]<<BitDepth_Y)+((1<<\log 2\ Div)>>1) \quad (H\text{-}14)$$

$$\text{scale}=cp\_scale[j] \quad (H\text{-}15)$$

$$DepthToDisparityB[j][d]=(scale*d+\text{offset})>>\log 2\ Div \quad (H\text{-}16)$$

$$\text{invOffset}=((cp\_inv\_off\_plus\_off[j]-cp\_off[j])<<BitDepth_Y)+((1<<\log 2\ Div)>>1) \quad (H\text{-}17)$$

$$\text{invScale}=(cp\_inv\_scale\_plus\_scale[j]-cp\_scale[j]) \quad (H\text{-}18)$$

$$DepthToDisparityF[j][d]=(\text{invScale}*d+\text{invOffset})>>\log 2\ Div \quad (H\text{-}19)$$

Here, $BitDepth_Y$ is the bit depth of luma component of depth pixel.

The array DepthToDisparityB[j] is used to convert the depth value to the disparity between the current view and the view with ViewIdx (view index) equal to j.

Based on a disparity vector derived as described above, e.g., an IDV, a video coder may add an inter-view motion parameter candidate, e.g., the inter-view Predicted Motion Vector Candidate (IPMVC), if available, to the motion parameter candidate lists for AMVP and skip/merge modes. The IPMVC, if available, is a temporal motion vector. Since skip mode has the same motion vector derivation process as merge mode, all techniques described in this document may apply to both merge and skip modes.

For the merge/skip mode, a video coder may derive the IPMVC candidate for a current block as follows:

A corresponding block of the current PU/CU in a reference view of the same access unit is located by the disparity vector, e.g., the IDV derived as described above.

If the corresponding block is not intra-coded and not inter-view predicted and its reference picture has a POC value equal to that of one entry in the same reference picture list of current PU/CU, its motion parameters (prediction direction, reference pictures, and motion vectors), after converting the reference index based on POC, are derived to be the IPMVC.

In order to identify the corresponding block of the current PU/CU in a reference view of the same access unit using the disparity vector, a video coder may denote a luma location (xP, yP) of the top-left luma sample of the current prediction unit relative to the top-left luma sample of the current picture. The values nPSW and nPSH denote the width and height of the current prediction unit, respectively. Additional values for identification of the corresponding block include the reference view order index refViewIdx, and a disparity vector mvDisp. The video coder may derive a reference layer luma location (xRef, yRef) by:

$$xRef=Clip3(0,PicWidthInSamples_L-1,xP+\\((nPSW-1)>>1)+((mvDisp[0]+2)>>)) \quad (H\text{-}124)$$

$$yRef=Clip3(0,PicHeightInSamples_L-1,yP+\\((nPSH-1)>>1)+((mvDisp[1]+2)>>)) \quad (H\text{-}125)$$

The video coder may then set the corresponding block as the prediction unit that covers the luma location (xRef, yRef) in the view component with ViewIdx equal to refViewIdx.

Figure 5:
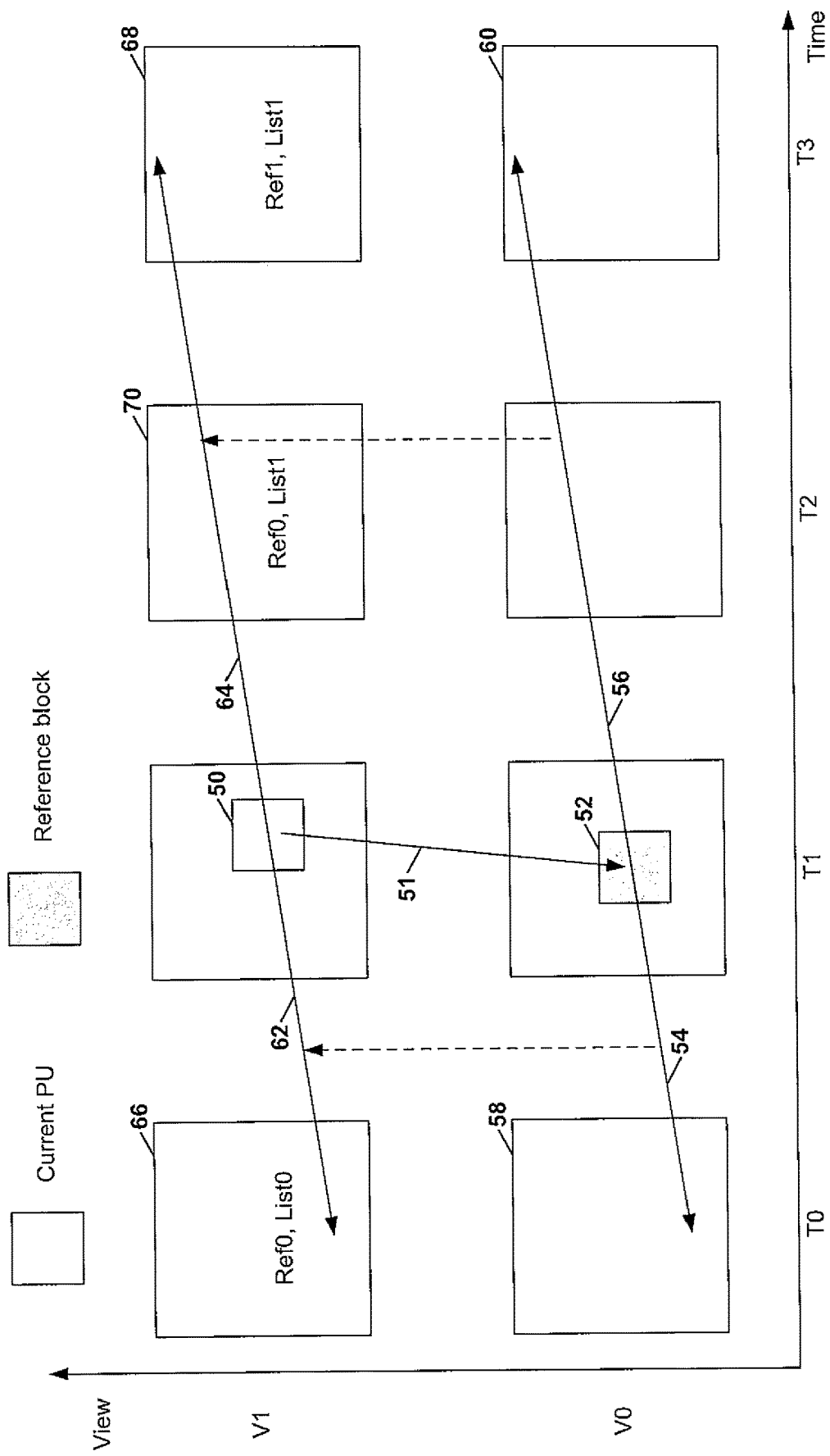
FIG. 5 is a conceptual diagram illustrating an example derivation of inter-view predicted motion vector candidate.

FIG. 5 is a conceptual diagram illustrating an example derivation of an IPMVC for merge/skip mode. In other words, FIG. 5 shows an example of the derivation process of the inter-view predicted motion vector candidate. In the example of FIG. 5, a current PU 50 occurs in view V1 at a time instance T1. A reference PU 52 for current PU 50 occurs in a different view than current PU 50 (i.e., view V0) and at the same time instance as current PU (i.e., time instance T1). A video coder, e.g., video encoder 20 or video decoder 30, may identify reference PU 52 based on a disparity vector 51, e.g., IDV, derived for current PU 50, as described above.

In the example of FIG. 5, reference PU 52 is bi-directionally inter predicted. Hence, reference PU 52 has a first motion vector 54 and a second motion vector 56. Motion vector 54 indicates a position in a reference picture 58. Reference picture 58 occurs in view V0 and in time instance T0. Motion vector 56 indicates a position in reference picture 60. Reference picture 60 occurs in view V0 and in time instance T3.

The video coder may generate, based on the motion information of reference PU 52, an IPMVC for inclusion in a merge candidate list of current PU 50. The IPMVC may have a first motion vector 62 and a second motion vector 64. Motion vector 62 matches motion vector 54 and motion vector 64 matches motion vector 56. The video coder generates the IPMVC such that a first reference index of the IPMVC indicates a position in RefPicList0 for current PU 50 of a reference picture (i.e., reference picture 66) occurring in the same time instance as reference picture 58 (i.e., time instance T0). In the example of FIG. 5, reference picture 66 occurs in the first position (i.e., Ref0) in RefPicList0 for current PU 50. Furthermore, the video coder generates the IPMVC such that a second reference index of the IPMVC indicates a position in RefPicList1 for current PU 50 of a reference picture (i.e., reference picture 68) occurring in the same time instance as reference picture 60. Thus, in the example of FIG. 5, the RefPicList0 reference index of the IPMVC may be equal to 0. In the example of FIG. 5, a reference picture 70 occurs in the first position (i.e., Ref0) in RefPicList1 for current PU 50 and reference picture 68 occurs in the second position (i.e., Ref1) in RefPicList1 for current PU 50. Thus, the RefPicList1 reference index of the IPMVC may be equal to 1.

Figure 6:
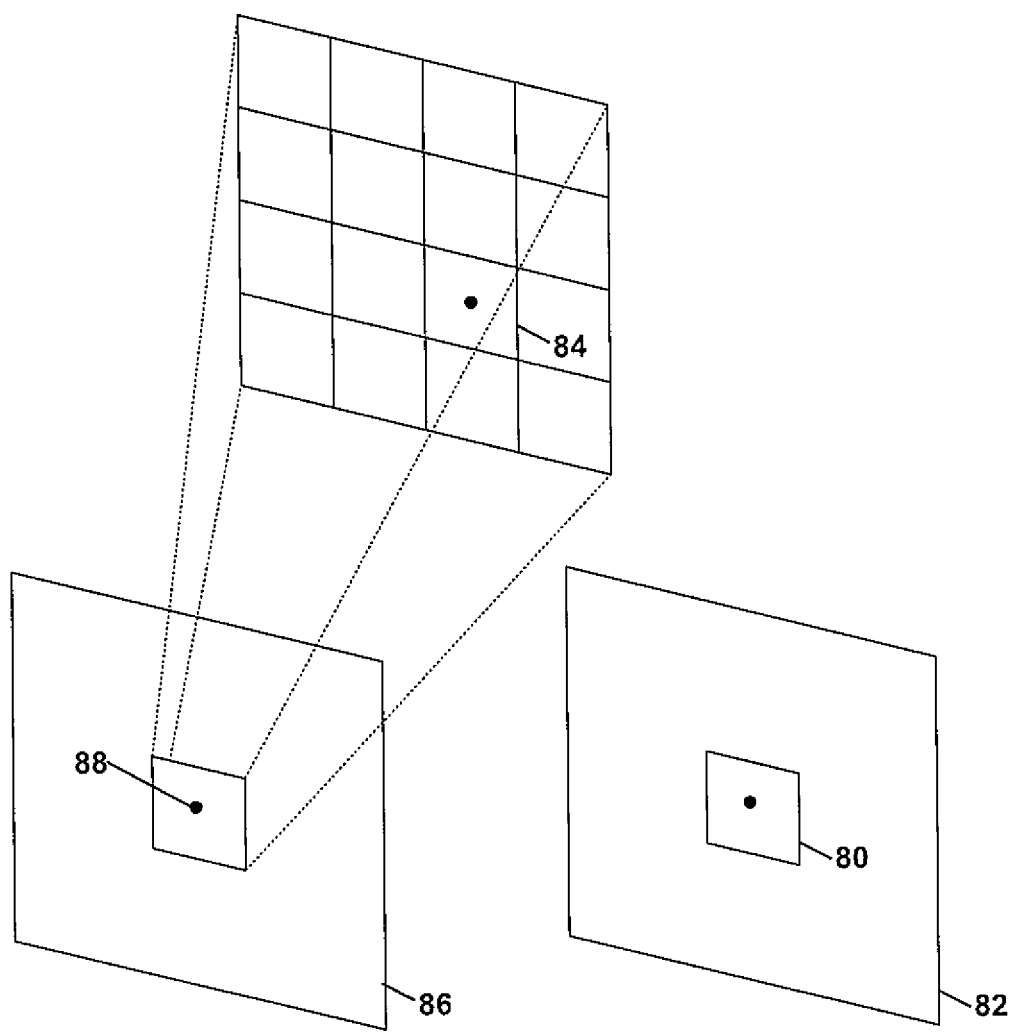
FIG. 6 is a conceptual diagram illustrating an example derivation of a motion parameter inheritance (MPI) candidate.

FIG. 6 is a conceptual diagram illustrating an example derivation of a motion parameter inheritance (MPI) candidate for depth coding. For inter prediction coding of a depth component in a multiview video bitstream, a video coder may derive one or more additional motion parameter candidates for inclusion in a motion parameter candidate list of a depth PU based on MPI. MPI may exploit the similarity of the motion characteristics between the texture images and its associated depth images. For a given PU in the depth image, a MPI candidate reuses the motion parameters, e.g., motion vectors and reference indices, of the already coded corresponding texture block, if it is available. FIG. 6 shows an example of the derivation process of the MPI candidate where the corresponding texture block is selected as the 4×4 block located to the right bottom of the center of the current PU.

In particular, FIG. 6 illustrates a current depth PU 80 within the depth component 82, i.e., depth picture 82, of the current access unit. In order to identify the corresponding or reference texture block 84 of current depth PU 80 within the texture component 86, i.e., texture picture, of the current access unit that is associated with depth component 82, a video coder may identify a reference sample location 88 in the texture component 86. The video coder may identify reference sample location 88 in texture component 86 based on the location and size of the current depth PU 80, as well as a desired reference block relative to the location and size of the current depth PU. Reference texture block 84 is a block in texture component 86 that covers reference sample location 88.

In the example of FIG. 6, the video coder identifies reference sample location 88 such that reference texture block 84 is selected as the 4×4 block located to the right bottom of the center of the current depth PU 80. The video coder may derive an MPI candidate for inclusion in the motion parameter candidate list for current depth PU 80 as being the motion parameters of reference texture block 84. It should be noted that motion vectors with integer precision are used in depth coding while quarter precision of motion vectors is utilized for texture coding. Therefore, the motion vector of the reference texture block shall be scaled before using as an MPI candidate.

For the MPI, only the motion information of the reference block is used for the current PU in the dependent view. However, the current PU may correspond to a reference area (with the same size as the current PU) in the reference picture that is larger than the reference block. The reference area corresponding to the current PU may have plentiful motion information.

Figure 7:
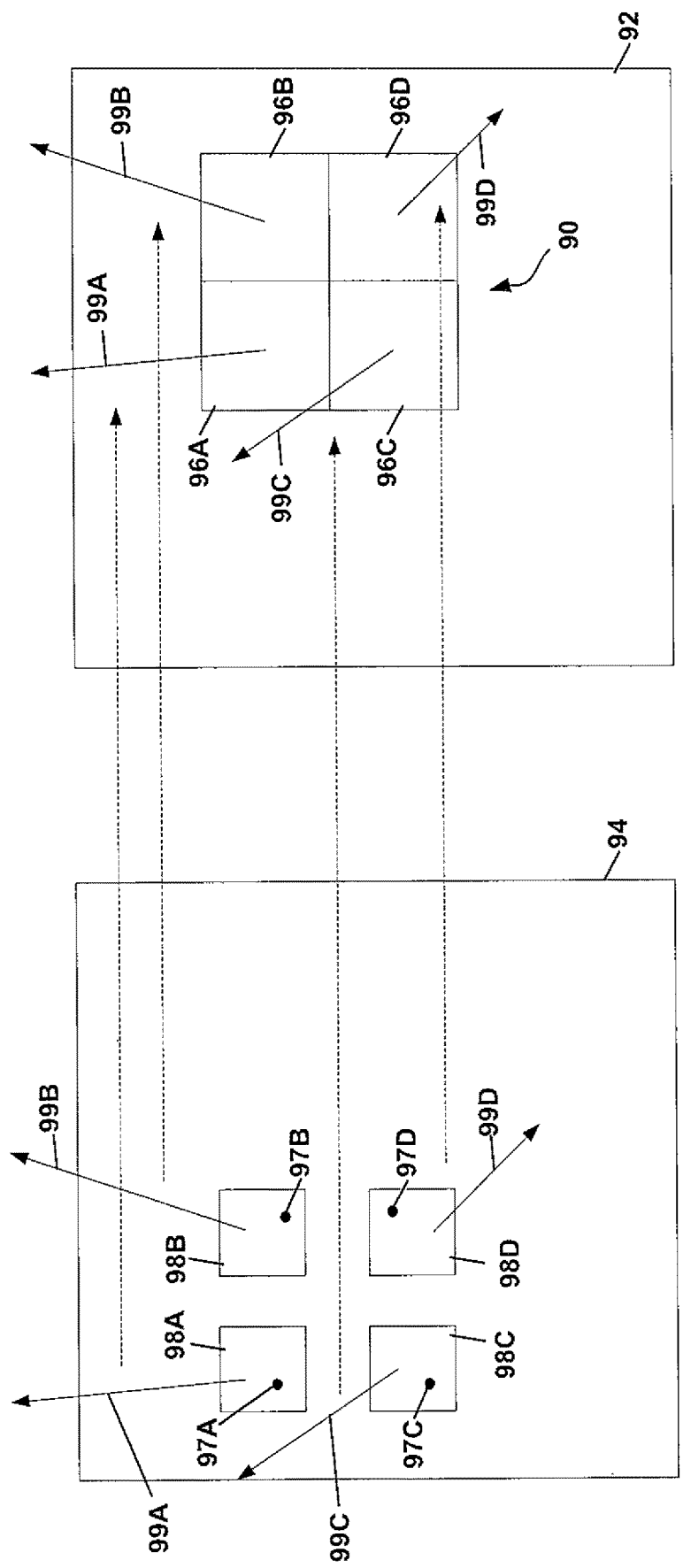
FIG. 7 is a conceptual diagram illustrating sub-prediction unit (PU) motion parameter inheritance (MPI).

FIG. 7 is a conceptual diagram illustrating sub-prediction unit (PU) MPI. In the sub-PU MPI candidate derivation process, e.g., as shown in FIG. 7, a video coder generates a set of motion parameters for each sub-PU. Meanwhile, the video coder also generates a Representative set of Motion Parameters (RMP) for pruning the sub-PU MPI candidate with other candidates, such as an IPMVC, TMC, or spatial candidates.

A video coder may derive the sub-PU MPI candidate as follows:
  Denote the assigned sub-PU size by N×N.
  Set representative motion vector rmvLX to (0, 0) and reference index rrefLX to −1 for each reference list, and set availability of sub-PU MPI candidate equal to false.
  Divide the current PU into multiple sub-PUs, each of which has a smaller size that the current PU. In the example of FIG. 7, the video coder has divided current depth PU 90 of depth component 92 into four sub-PUs 96A-96D (collectively, "sub-PUs 96"). Denote the size of current PU by nPSW×nPSH and size of sub-PU by nPSWsub×nPSHSub.

nPSWsub=(min(N,nPSW))

nPSHSub=(min(N,nPSH))

Set default motion vector tmvLX to (0, 0) and set reference index refLX to −1 for each reference picture list. For each sub-PU in the raster scan order, the following applies:

Obtain a reference sample location (xRefSub, yRefSub) by:

xRefSub=xPSub+nPSWsub/2 yRefSub=yPSub+nPSHSub/2 a block in the corresponding texture picture that covers (xRefSub, yRefSub) is used as the reference texture block for the current sub-PU. In the example of FIG. 7, the video coder has identified reference sample locations 97A-97D (collectively, "reference sample locations 97") for each of sub-PUs 96A-96D, respectively. Furthermore, the video coder has identified reference blocks 98A-98D (collectively, "reference blocks 98") as the blocks in texture component 94 that cover reference sample locations 97A-97D, respectively.

For each of the identified reference blocks,
  if the identified reference block is coded using temporal motion vectors, the following apply:
    If both refL0 and refL1 are equal to −1 and the current sub-PU is not the first one in the raster scan order, the motion information of the reference block is inherited by all the previous sub-PUs.
    The associated motion parameters can be used as candidate motion parameters for the current sub-PU.
    tmvLX and refLX are updated to the motion information of the current sub-PU.
    If both refL0 and refL1 are equal to −1, the RMP, i.e., rmvLX and rrefLX are updated to the motion parameters of the current sub-PU, and availability of sub-PU MPI candidate is set equal to true.
  Otherwise (the reference block is intra coded), the motion information of the current sub-PU is set to tmvLX and refLX.

In the example illustrated in FIG. 7, each of reference texture blocks 98A-98D was inter coded, and respectively include motion parameters including motion vectors 99A-99D (collectively, "motion vectors 99"). Sub-PU MPI results in each of sub-PUs 96 inheriting the respective motion parameters of reference texture blocks 98, including the respective motion vectors 99. A video coder derives a sub-PU MPI candidate for current depth PU 90 based on the motion parameters inherited by sub-PUs 96. In particular, the video coder may derive the sub-PU MPI candidate for inclusion in the motion parameter candidate list to be the RMP, which is determined as described above.

In the merge/skip mode, the video coder inserts the sub-PU MPI, if available, into the merge candidate list before all other motion parameter candidates. It should be noted that motion vectors with integer precision are used in depth coding while quarter precision of motion vectors is utilized for texture coding. Therefore, the video coder should scale the motion vector of the corresponding texture block before using the motion vector as a sub-PU MPI candidate. Additionally, a video coder may apply different sub-PU block sizes, such as 4×4, 8×8, and 16×16. A syntax element may present in VPS to indicate the sub-PU size. If the sub-PU size is large enough, e.g., larger than the current PU, the whole PU is considered as one sub-PU. Detailed semantics of such a syntax element, which may be coded with ue(v), are as follows:

log 2_sub_pb_mpi_size_minus3 specifies the value of the variable SubPbSizeMPI that is used in the decoding of prediction units using the sub prediction block based texture merging candidate. The value of log 2_sub_pb_mpi_size_minus3 shall be in the range of 0 to 3, inclusive.

The variable SubPbSizeMPI is derived as specified in the following:

SubPbSizeMPI=1<<(log 2_sub_pb_mpi_size_minus3+3)  (H-6)

According to one proposal, to facilitate parallel processing of sub-PUs for the sub-PU MPI candidate derivation process, a video coder generates a Default set of Motion Parameters (DMP) before processing any sub-PU (or any sub-PU in the current sub-PU row). Then, for each sub-PU (or each sub-PU in the current sub-PU row) whose corresponding texture block does not have available motion parameters, the video coder sets its candidate motion parameters equal to the DMP. In this way, motion parameters of all sub-PUs (or all sub-PUs in the current sub-PU row) can be generated in parallel.

According to this proposal, the video coder sets the DMP to be equal to the motion parameters of the co-located texture block of a representative block in the current depth PU:

1. In one example, the representative block is the block covering the center pixel of the current depth PU.
2. Alternatively, the representative block can be a block covering any given pixel within the current depth PU.
3. Alternatively, the representative block is the center sub-PU (the sub-PU located at the bottom right of the center) of the current depth PU.
4. Alternatively, the representative block is the first sub-PU in raster scan order of the current depth PU.
5. Alternatively, the representative block is the first sub-PU in raster scan order of the current depth sub-PU row.

If motion parameters of the co-located texture block of the representative block are unavailable, the video coder derives the DMP as follows: for each reference list, the default motion vector is set equal to zero motion vector, and the default reference index is set equal to the first available temporal reference picture in current reference picture list or 0. Meanwhile, the video coder sets the RMP as being equal to the DMP. Therefore, pruning the RMP with other candidates (i.e., IPMVC, and spatial candidates $A_1$, $B_1$) does not have to wait until motion parameters of all sub-PUs are generated.

Another motion parameter candidate that a video coder, e.g., video encoder 20 or video decoder 30, may include in a motion parameter candidate list for inter coding a depth block is the disparity derived depth (DDD) candidate. The basic concept of a DDD candidate is that disparity vector can be converted to depth value and therefore used to predict a depth PU. For the DDD candidate, all pixels within the depth PU are predicted by one single depth value. A video coder inserts DDD candidate into the motion parameter candidate list after the sub-PU MPI candidate and before the IPMVC candidate and the spatial or temporal candidates.

A video coder derives the single depth value (denoted as ddep) from the disparity motion vector, if available, (denoted as TexDv) of the co-located texture block of the current depth PU. Denote j as the view index of the reference view that Texdv pointing to and denote TexDvx as the horizontal component of TexDv, then the video coder converts ddep from TexDvx as follows:

$$ddep=(DDDInvScale[j]*TexDvx+DDDInvOffset[j])>>DDDShift[j] \quad (1)$$

The variables DDDInvScale[j], DDDInvOffset[j] and DDDShift[j] are derived by using the pseudo-code in Table 3, where cp_scale, cp_offset and $BitDepth_Y$ are defined in a set of camera parameters provided in a VPS or slice segment header as described above with respect to Table 1 and Table 2.

TABLE 3

Derivation of DDDInvScale[j], DDDInvOffset[j] and DDDShift[j]

```
AbsScale = abs(cp_scale[ j ])
CpWidth = ceil(log₂(cp_scale[ j ]))+9
TargetV = 1<< CpWidth
BestD = 256
MinError = abs(AbsScale *256 − TargetV)
for( d = 256; d < 511; d++) {
    if(abs(AbsScale *d − TargetV) < MinError) {
        MinError = abs(AbsScale *d− TargetV)
        BestD = d
    }
}
if( TargetV −AbsScale * BestD == 0 ) {
    RoundingDir = 0;
} else {
    RoundingDir = Sign(TargetV −AbsScale * BestD)
}
DDDInvScale[j] =
(BestD<<(BitDepth_Y +cp_precision−1 ))*Sign(cp_scale[ j ])
DDDShift[i] = CpWidth
DDDInvOffset[i] = −Sign(cp_scale[ j ])*
BestD*( cp_off[ j ]<< BitDepth_Y)+ (1<<( DDDShift[i]-1)) +
(1<<( DDDShift[i]-4))* RoundingDir
```

A video coder, e.g., video encoder 20 and/or video decoder 30, may construct a merging candidate list, as an example of a motion parameter candidate list, for a current depth PU as follows. The video coder may first derive a disparity vector for the current depth PU as described above. With the disparity vector, the merging candidate list construction process for depth views in 3D-HEVC can be defined as follows:

1. Sub-PU MPI Insertion
   Sub-PU MPI is derived by the procedure described above. If it is available, it is inserted to the merge list.
2. DDD Insertion
   DDD is derived by the procedure described above. If it is available, it is inserted to the merge list.
3. IPMVC Insertion
   An IPMVC is derived by the procedure described above. If the IPMVC is available and is not same with the RMP generated in the sub-PU MPI candidate derivation process, it is inserted to the merge list.
4. Derivation Process for Spatial Merging Candidates Insertion in 3D-HEVC
   Check the motion information of spatial neighboring PUs, e.g., as illustrated in FIG. 2, in the following order: $A_1$, $B_1$, $B_0$, $A_0$, or $B_2$. Constrained pruning is performed by the following procedures:

If $A_1$ and RMP have the same motion vectors and the same reference indices, $A_1$ is not inserted into the candidate list; otherwise $A_1$ is inserted into the list.
   If $B_1$ and $A_1$/RMP have the same motion vectors and the same reference indices, $B_1$ is not inserted into the candidate list; otherwise $B_1$ is inserted into the list.
   If $B_0$ is available, $B_0$ is added to the candidate list.
   If $A_0$ is available, $A_0$ is added to the candidate list.
   If $B_2$ is available, $B_2$ is added to the candidate list.
5. Derivation Process for Temporal Merging Candidate
   Similar to the temporal merging candidate derivation process in HEVC where the motion information of the co-located PU is utilized, however, the target reference picture index of the temporal merging candidate may be changed instead of fixing to be 0. When the target reference index equal to 0 corresponds to a temporal reference picture (in the same view) while the motion vector of the co-located PU points to an inter-view reference picture, the target reference index is changed to another index which corresponds to the first entry of inter-view reference picture in the reference picture list. On the contrary, when the target reference index equal to 0 corresponds to an inter-view reference picture while the motion vector of the co-located PU points to a temporal reference picture, the target reference index is changed to another index which corresponds to the first entry of temporal reference picture in the reference picture list.
6. Derivation Process for Combined Bi-Predictive Merging Candidates in 3D-HEVC
   If the total number of candidates derived from the above two steps are less than the maximum number of candidates, the same process as defined in HEVC is performed except the specification of l0CandIdx and l1CandIdx. FIG. 8 is a table indicating an example specification of l0CandIdx and l1CandIdx in 3D-HEVC. The relationship among combIdx, l0CandIdx and l1CandIdx are defined in the table of FIG. 8.
7. Derivation Process for Zero Motion Vector Merging Candidates
   The same procedure as defined in HEVC is performed. In some versions of 3D-HEVC, the total number of candidates in the merge (e.g., MRG) list is up to 6 and five_minus_max_num_merge_cand is signaled to specify the maximum number of the merge candidates subtracted from 6 in slice header. five_minus_max_num_merge_cand is in the range of 0 to 5, inclusive.

Existing proposals for sub-PU MPI candidate derivation for a depth PU may have one or more problems. For example, according to the proposals for 3D-HEVC, sub-PUs have to be processed in serial. In the worst case scenario (where only the last sub-PU in raster scan order of the current depth PU has available motion parameters), all sub-PUs cannot be motion predicted before the last sub-PU is motion predicted. Meanwhile, in the worst case scenario, the sub-PU MPI candidate cannot be pruned with other motion parameter candidates before the last sub-PU is motion predicted. Accordingly, this design is not friendly to parallel processing of the sub-PUs, or of the various motion parameter candidates derived for the motion parameter candidate list.

As another example, the proposal to facilitate parallel processing of sub-PUs for the sub-PU MPI candidate derivation process discussed above is designed to facilitate parallel processing, but DMP is always set equal to zero motion vectors when motion parameters of the co-located texture block of the representative block of the current depth PU are unavailable. This gives high priority to zero motion vectors, particularly considering that sub-PU MPI candidate is added into the first position of the merge candidate list, which may not be reasonable and may lead to bit rate increase.

One or more techniques of this disclosure are related to derivation of the sub-PU MPI candidate during coding of depth views, e.g., in 3D-HEVC, and may provide solutions to the one or more problems identified above. For example, according to the techniques of this disclosure, a video coder, e.g., video encoder 20 and/or video decoder 30, may consider the sub-PU MPI merging candidate unavailable if motion parameters of the co-located texture block of a representative block of the current depth PU are unavailable. In some examples, the video coder may consider the sub-PU MPI merging candidate unavailable when the co-located texture block of the representative block is intra coded.

In some examples, when the co-located texture block is inter coded, the video coder may nevertheless consider the sub-PU MPI merging candidate unavailable if the associated depth picture of a reference picture for the co-located texture block is not included in the reference picture list(s) of the current depth PU. In other words, when the co-located texture block is inter coded, the video coder may identify a reference texture picture for the co-located texture block from the motion parameters of the co-located texture block. The video coder may further identify a depth picture that is associated with identified reference picture, e.g., the depth picture that corresponds to the identified reference picture. The video coder may then determine whether the identified depth picture is included in the reference picture list(s), e.g., L0 and/or L1, of the current depth PU. If the identified depth picture is not included in the reference picture lists for the current depth PU, the video coder may consider the sub-PU MPI merging candidate unavailable for the merge candidate list for the current depth PU.

In addition, to simplify the depth merge list, a video coder, e.g., video encoder 20 and/or video decoder 30, may add the sub-PU MPI merging candidate to the merge list only when the depth PU is coded with partition mode 2N×2N. For depth PUs coded with other partition modes, such as 2N×N, 2N×nU, 2N×nD, N×2N, nL×2N, nR×2N or N×N, the video coder may add an MPI merging candidate, e.g., derived as described above with respect to FIG. 6, to the merge list to replace the sub-PU MPI merging candidate. Any or all of the techniques described in this disclosure may be implemented separately or in conjunction with each other.

An example implementation of the above identified techniques is shown below, with additions relative to the 3D-HEVC Draft Text 3 shown as text enclosed in <ins> . . . </ins> tags, and deletions relative to the 3D-HEVC Draft Text 3 shown as text enclosed in <dlt> . . . </dlt> tags.

1.8.5.3.2.18 Derivation Process for a Sub Prediction Block Texture Merging Candidate This process is not invoked when mpi_flag[nuh_layer_id] is equal to 0.

Inputs to this process are:
   a luma location (xPb, yPb) of the top-left sample of the current prediction luma block relative to the top-left luma sample of the current picture,
   two variables nPbW and nPbH specifying the width and the height of the current prediction block, Outputs of this process are:
   the flags availableFlagT specifying whether the texture merging candidate is available,
   the prediction utilization flags predFlagLXT,
   the texture merging candidate mvLXT, with X in the range of 0 to 1, inclusive,
   the reference index refIdxLXT, with X in the range of 0 to 1, inclusive, specifying a reference picture in the reference picture list RefPicListLX, The variable availableFlagT is set equal to 0. For X in the range of 0 and 1, inclusive, the variable predFlagLXT is set equal to 0, the variable refIdxLXT is set equal to −1 and both components of the motion vector mvLXT are set equal to 0. The variables nSbW and nSbH are derived as:

$$nSbW = nPbW/MpiSubPbSize <= 1\ ?\ nPbW : MpiSubPbSize \quad \text{(H-157)}$$

$$nSbH = nPbH/MpiSubPbSize <= 1\ ?\ nPbH : MpiSubPbSize \quad \text{(H-158)}$$

<ins>Alternatively, if PartMode is not equal to PART_2N×2N, the variables nSbW and nSbH are derived as specified in the following:

$$nSbW = nPbW \quad \text{(H-159)}$$

$$nSbH = nPbH \quad \text{(H-160)}$$</ins>

Let textPic be the picture with PicOrderCntVal and ViewIdx equal to PicOrderCntVal and ViewIdx of the current picture and DepthFlag being equal to 0. The variable textRefPicListX is set equal to the corresponding variable RefPicListX of the picture specified by textPic, with X in the range of 0 to 1, inclusive. The variable curSubBlockIdx is set equal to 0 and the variable lastAvailableFlag is set equal to 0.

<ins>The variables PredFlagLXT, MvLXT, RefIdxLXT and availableFlagT are derived as specified in the following:
   The variable availableFlagT is set equal to 0
   The luma location (xText, yText) is derived by $$xTextFull = xPb + (nPbW/nSbW/2) * nSbW + nSbW/2 \quad \text{(H-161)}$$

$$yTextFull = yPb + (nPbH/nSbH/2) * nSbH + nSbH/2 \quad \text{(H-162)}$$

$$xText = (xTextFull >> 3) << 3 \quad \text{(H-163)}$$

$$yText = (yTextFull >> 3) << 3 \quad \text{(H-164)}$$

Let textPU be the PU covering the position (xText, yText) in textPic. For X in the range of 0 to 1, inclusive, the following applies:
   The variable textPredFlagLX is set equal to PredFlagLX of textPU. The variable textRefIdxLX is set equal to RefIdxLX of textPU. The variable textMvLX is set equal to the MvLX of textPU. The variable curAvailableFlagLX is set equal to 0.
   When X is equal to 0 or the current slice is a B slice, for i in the range of 0 to NumRefPicsLX−1, inclusive, the following applies:
      When all of the following conditions are true, curAvailableFlagLX is set equal to 1,
         textPredFlagLX[xRef][yRef] is equal to 1
         PicOrderCnt(RefPicListX[i]) is equal to PicOrderCnt(textRefPicListX[textRefIdxLX])
         ViewIdx(RefPicListX[i]) is equal to ViewIdx(textRefPicListX[textRefIdxLX])
      If curAvailableFlagLX is equal to 1, the following applies:

$$MvLXT = (textMvLX[xTextPb][yTextPb] + 2) >> 2 \quad \text{(H-165)}$$

$$RefIdxLXT = i \quad \text{(H-166)}$$

$$PredFlagLXT = 1 \quad \text{(H-167)}$$

When curAvailableFlagL0 is equal to 1 or curAvailableFlagL1 is equal to 1, availableFlagT is set equal to 1.
If availableFlagT is equal to 1, the following applies:</ins>
For yBlk in the range of 0 to (nPbH/nSbH−1), inclusive, the following applies:
  For xBlk in the range of 0 to (nPbW/nSbW−1), inclusive, the following applies:
    The variable curAvailableFlag is set equal to 0
    For X in the range of 0 to 1, inclusive, the following applies:
      The flag spPredFlagLX[xBlk][yBlk] is set equal to 0
      The motion vector spMvLX is set equal to (0, 0)
      The reference index spRefIdxLX[xBlk][yBlk] is set equal to −1
    The luma location (xText, yText) is derived by $$xTextFull = xPb + xBlk * nSbW + nSbW/2 \quad\quad (H\text{-}168)$$

$$yTextFull = yPb + yBlk * nSbH + nSbH/2 \quad\quad (H\text{-}169)$$

$$xText = (xTextFull \gg 3) \ll 3 \quad\quad (H\text{-}170)$$

$$yText = (yTextFull \gg 3) \ll 3 \quad\quad (H\text{-}171)$$

Let textPU be the PU covering the position (xText, yText) in textPic. For X in the range of 0 to 1, inclusive, the following applies:
      The variable textPredFlagLX is set equal to PredFlagLX of textPU. The variable textRefIdxLX is set equal to RefIdxLX of textPU. The variable textMvLX is set equal to the MvLX of textPU.
      When X is equal to 0 or the current slice is a B slice, for i in the range of 0 to NumRefPicsLX−1, inclusive, the following applies:
        When all of the following conditions are true, curAvailableFlagLX is set equal to 1,
        textPredFlagLX[xRef][yRef] is equal to 1
        PicOrderCnt(RefPicListX[i]) is equal to PicOrderCnt(textRefPicListX[textRefIdxLX])
        ViewIdx(RefPicListX[i]) is equal to ViewIdx(textRefPicListX[textRefIdxLX])
        If curAvailableFlagLX is equal to 1, the following applies:

$$spMvLX[xBlk][yBlk] = (textMvLX[xTextPb][yTextPb]+2) \gg 2 \quad\quad (H\text{-}172)$$

$$spRefIdxLX[xBlk][yBlk] = i \quad\quad (H\text{-}173)$$

$$spPredFlagLX[xBlk][yBlk] = 1 \quad\quad (H\text{-}174)$$

When curAvailableFlagL0 is equal to 1 or curAvailableFlagL1 is equal to 1, curAvailableFlag is set equal to 1.
<dlt>Depending on</dlt><ins>if</ins>curAvailableFlag <ins> is equal to 0</ins>, the following applies <ins>for X in the range of 0 to 1, inclusive</ins>:
<dlt>If curAvailableFlag is equal to 1, the following applies:
1. When lastAvailableFlag is equal to 0, the following applies:
  Set availableFlagT equal to 1.
  For X in the range of 0 to 1, inclusive, the following applies:

$$mvLXT = spMvLX[xBlk][yBlk] \quad\quad (H\text{-}181)$$

$$refIdxLXT = spRefIdxLX[xBlk][yBlk] \quad\quad (H\text{-}182)$$

$$predFlagLXT = spPredFlagLX[xBlk][yBlk] \quad\quad (H\text{-}182)$$

When curSubBlockIdx is greater than 0, the following applies for k in the range of 0 to (curSubBlockIdx−1), inclusive:
  The variables i and k are derived as specified in the following:

$$i = k \% (nPbW/nSbW) \quad\quad (H\text{-}162)$$

$$j = k/(nPbW/nSbW) \quad\quad (H\text{-}163)$$

For X in the range of 0 to 1, inclusive, the following applies:

$$spMvLX[i][j] = spMvLX[xBlk][yBlk] \quad\quad (H\text{-}164)$$

$$spRefIdxLX[i][j] = spRefIdxLX[xBlk][yBlk] \quad\quad (H\text{-}165)$$

$$spPredFlagLX[i][j] = spPredFlagLX[xBlk][yBlk] \quad\quad (H\text{-}166)$$

2. The variable lastAvailableFlag is set equal to 1.
3. The variables xLastAvail and yLastAvail are set equal to xBlk and yBlk, respectively.
Otherwise (curAvailableFlag is equal to 0), when lastAvailableFlag is equal to 1, the following applies for X in the range of 0 to 1, inclusive:</dlt>

$$spMvLX[xBlk][yBlk] = \text{<dlt>}spMvLX[xLastAvail][yLastAvail]\text{</dlt><ins>}MvLXT\text{</ins>} \quad\quad (H\text{-}175)$$

$$spRefIdxLX[xBlk][yBlk] = \text{<dlt>}spRefIdxLX[xLastAvail][yLastAvail]\text{</dlt><ins>}RefIdxLXT\text{</ins>} \quad\quad (H\text{-}176)$$

$$spPredFlagLX[xBlk][yBlk] = \text{<dlt>}spPredFlagLX[xLastAvail][yLastAvail]\text{</dlt><ins>}PredFlagLXT\text{</ins>} \quad\quad (H\text{-}177)$$

<dlt>The variable curSubBlockIdx is set equal to curSubBlockIdx+1.</dlt>
For use in derivation processes of variables invoked later in the decoding process, the following assignments are made for x=0 . . . nPbW−1 and y=0 . . . nPbH−1:
  The variable SubPbPartIdc is derived as specified in following:

$$SubPbPartIdc[xPb+x][yPb+y] = SUB\_PART\_DEFAULT \quad\quad (I\text{-}178)$$

For X in the range of 0 to 1, inclusive, the following applies:
    The variables SubPbPredFlagLX, SubPbMvLX and SubPbRefIdxLX are derived as specified in following:

$$SubPbPredFlagLX[xPb+x][yPb+y] = spPredFlagLX[x/nSbW][y/nSbW] \quad\quad (H\text{-}179)$$

$$SubPbMvLX[xPb+x][yPb+y] = spMvLX[x/nSbW][y/nSbW] \quad\quad (H\text{-}180)$$

$$SubPbRefIdxLX[xPb+x][yPb+y] = spRefIdxLX[x/nSbW][y/nSbW] \quad\quad (H\text{-}181)$$

The derivation process for chroma motion vectors in subclause 8.5.3.2.9 is invoked with SubPbMvLX[xPb+x][yPb+y] as input and the output is SubPbMvCLX[xPb+x][yPb+y]

Figure 9:
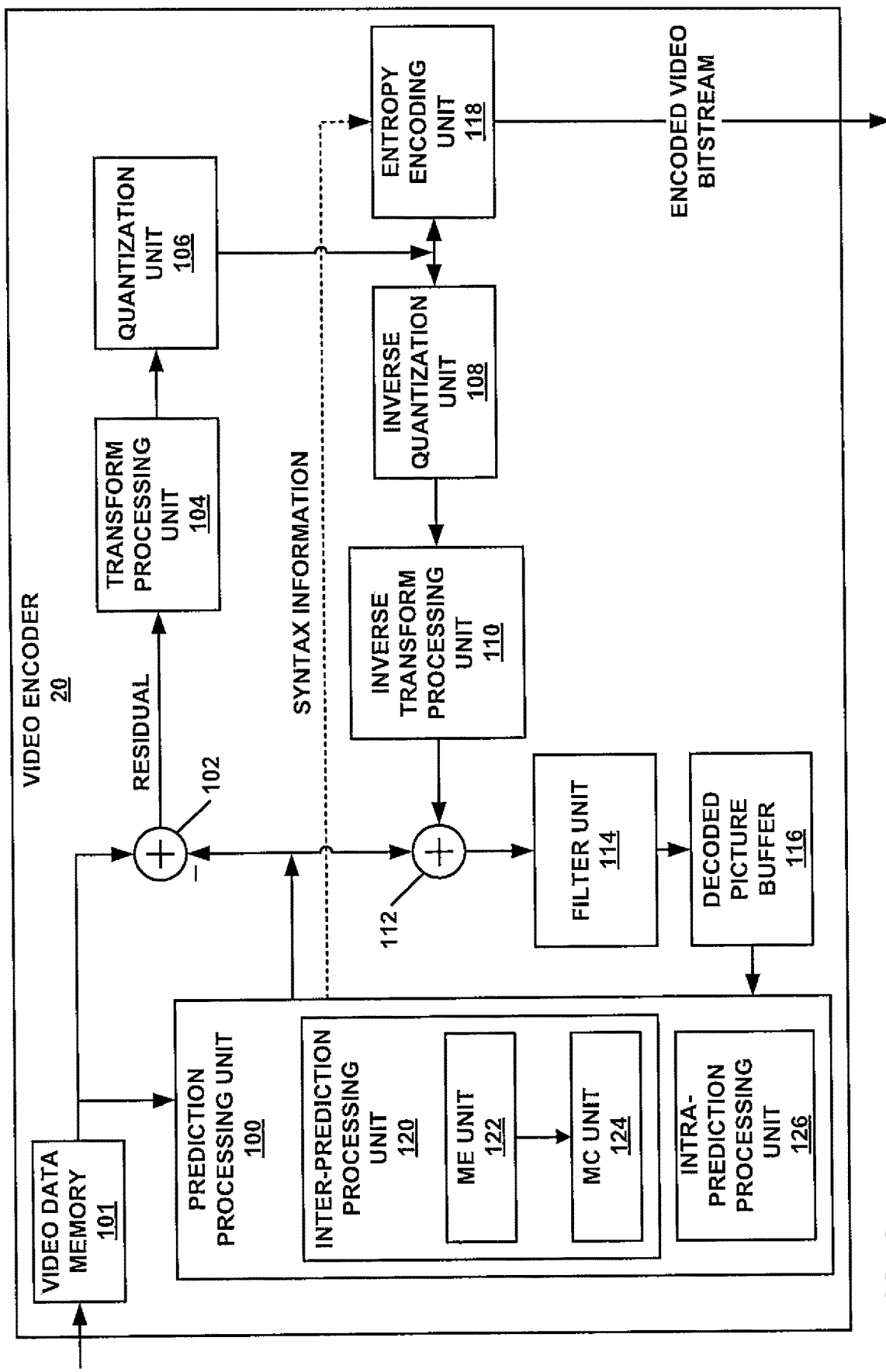
FIG. 9 is a block diagram illustrating an example video encoder that may implement the techniques described in this disclosure.

FIG. 9 is a block diagram illustrating an example video encoder 20 that may implement the techniques of this disclosure. FIG. 9 is provided for purposes of explanation and should not be considered limiting of the techniques as broadly exemplified and described in this disclosure. This disclosure describes video encoder 20 in the context of HEVC coding and, more particularly, 3D-HEVC coding, e.g., as described in 3D-HEVC WD and as further modified as described in this disclosure. However, the techniques of this disclosure may be applicable to other coding standards or methods. However, the techniques of this disclosure may be applicable to other coding standards or methods.

In the example of FIG. 9, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation (ME) unit 122 and a motion compensation (MC) unit 124. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices.

The components of prediction processing unit 100 are described as performing both texture encoding and depth encoding. In some examples, texture and depth encoding may be performed by the same components of prediction processing unit 100 or different components within prediction processing unit 100. For example, separate texture and depth encoders may be provided in some implementations. Also, multiple texture and depth encoders may be provided to encode multiple views, e.g., for multiview plus depth coding.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

Video encoder 20 is an example of a video encoder configured to perform any of the techniques described in this disclosure. Additional 3D processing components may also be included within video encoder 20. In accordance with one or more techniques of this disclosure, one or more units within video encoder 20 may perform the techniques described herein as part of a video encoding process. For example, inter-prediction processing unit 120, including motion estimation unit 122 and motion compensation unit 124, may be configured to perform the techniques described herein as part of a video encoding process.

Video encoder 20, e.g., inter-prediction processing unit 120, may be configured to use techniques described herein to construct a motion parameter candidate list, e.g., merge candidate list, for encoding a current depth PU. More particularly, video encoder 20, e.g., inter-prediction processing unit 120, may be configured to use the techniques described herein to simplify the decision of whether to derive a sub-PU MPI candidate for inclusion in the motion parameter candidate list for the current depth PU.

In this manner, a device including video encoder 20 is an example of a video encoding device comprising a memory storing a coded video bitstream that includes multiview video data, and one or more processors. The one or more processors are configured to generate a motion parameter candidate list for a current depth prediction unit (PU) in a depth component of a current view of the multiview video data. The one or more processors are further configured to identify a co-located texture block to a representative block of the current depth PU, wherein a location of the co-located texture block in a texture component of the current view corresponds to a location of the representative block of the current depth PU in the depth component. The one or more processors are further configured to determine that motion parameters of the co-located texture block are unavailable and, in response to the determination that motion parameters of the co-located texture block are unavailable, determine that a sub-PU motion parameter inheritance candidate is unavailable for inclusion in the motion parameter candidate list for the current depth PU. The one or more processors are further configured to encode motion information for the current depth PU based on the motion parameter candidate list for the current depth PU without the sub-PU motion parameter inheritance candidate.

A device including video encoder 20 is also an example of a video encoding device comprising a memory storing a coded video bitstream that includes multiview video data, and one or more processors. The one or more processors are configured to generate a motion parameter candidate list for a current depth prediction unit (PU) in a depth component of a current view of the multiview video data. The one or more processors are further configured to derive a sub-PU motion parameter inheritance candidate for inclusion in the motion parameter candidate list for the current depth PU only if a partition mode of the current depth PU is 2N×2N, and encode the current depth PU based on the motion parameter candidate list for the current depth PU.

Figure 10:
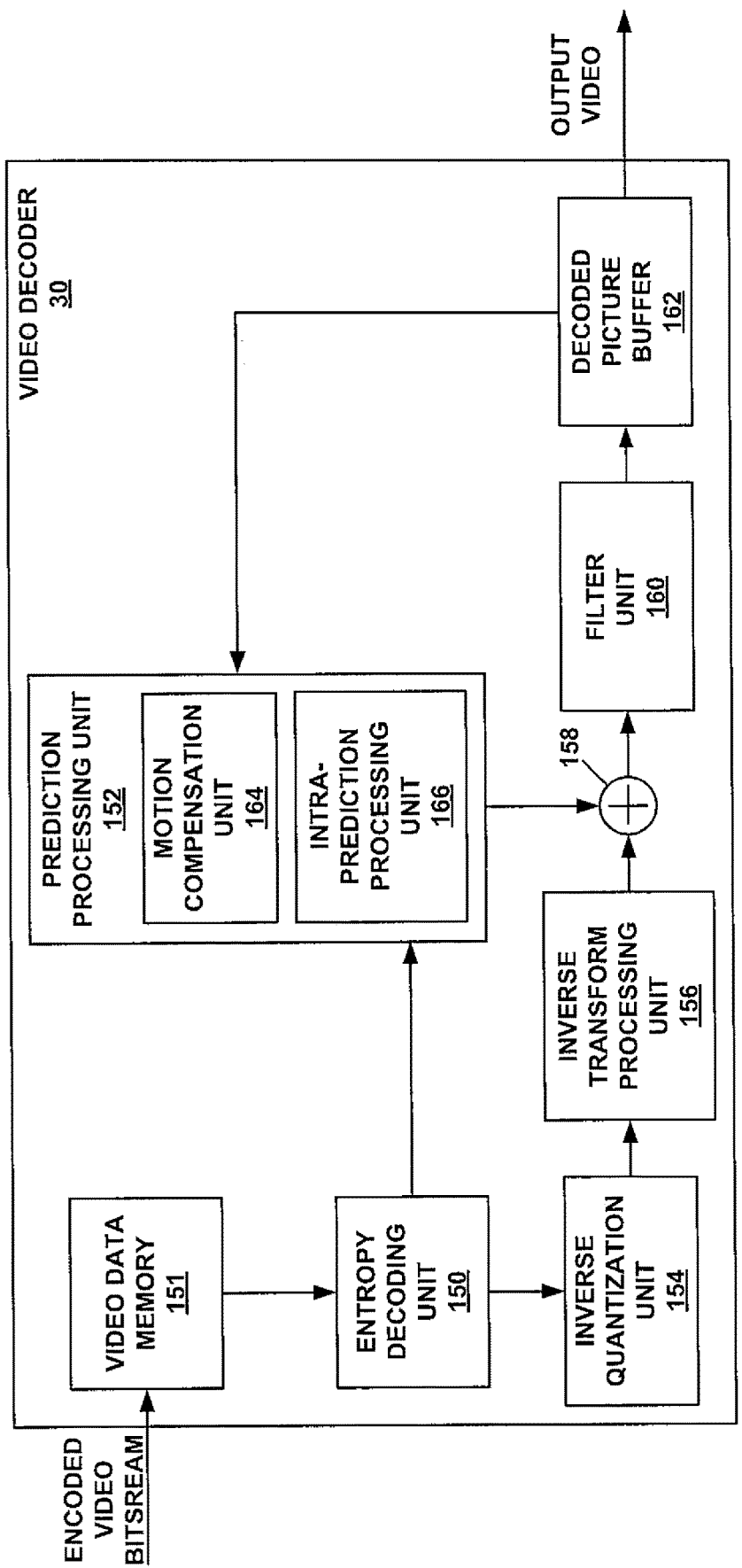
FIG. 10 is a block diagram illustrating an example video decoder that may implement the techniques described in this disclosure.

FIG. 10 is a block diagram illustrating an example video decoder 30 that is configured to implement the techniques of this disclosure. FIG. 10 is provided for purposes of explanation and is not limiting on the techniques as broadly exemplified and described in this disclosure. This disclosure describes video decoder 30 in the context of HEVC coding and, in particular, 3D-HEVC coding. However, the techniques of this disclosure may be applicable to other coding standards or methods.

In the example of FIG. 10, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices.

For ease of illustration, the components of prediction processing unit 152 are described as performing both texture decoding and depth decoding. In some examples, texture and depth decoding may be performed by the same components of prediction processing unit 152 or different components within prediction processing unit 152. For example, separate texture and depth decoders may be provided in some implementations. Also, multiple texture and depth decoders may be provided to decode multiple views, e.g., for multiview plus depth coding. In either case, prediction processing unit 152 may be configured to intra- or inter-decode texture data and depth data as part of a 3D coding process, such as a 3D-HEVC process.

A coded picture buffer (CPB) 151 may receive and store encoded video data (e.g., NAL units) of a bitstream. Entropy decoding unit 150 may receive NAL units from CPB 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice.

In addition to decoding syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive luma, Cb, and Cr blocks for the PU.

Reconstruction unit 158 may use the residual values from the luma, Cb, and Cr transform blocks associated with TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU.

Filter unit 160 may perform a deblocking operation to reduce blocking artifacts associated with the luma, Cb, and Cr coding blocks of the CU. Video decoder 30 may store the luma, Cb, and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Video encoder 30 is an example of a video decoder configured to perform any of the techniques described in this disclosure. Additional 3D processing components may also be included within video encoder 30. In accordance with one or more techniques of this disclosure, one or more units within video decoder 30 may perform the techniques described herein as part of a video decoding process. For example, motion compensation unit 164 may be configured to perform the techniques described herein as part of a video decoding process.

Video decoder 30, e.g., motion compensation unit 164, may be configured to use techniques described herein to construct a motion parameter candidate list, e.g., merge candidate list, for decoding a current depth PU. More particularly, video decoder 30, e.g., motion compensation unit 164, may be configured to use the techniques described herein to simplify the decision of whether to derive a sub-PU MPI candidate for inclusion in the motion parameter candidate list for the current depth PU.

In this manner, a device including video decoder 30 is an example of a video decoding device comprising a memory storing a coded video bitstream that includes multiview video data, and one or more processors. The one or more processors are configured to generate a motion parameter candidate list for a current depth prediction unit (PU) in a depth component of a current view of the multiview video data. The one or more processors are further configured to identify a co-located texture block to a representative block of the current depth PU, wherein a location of the co-located texture block in a texture component of the current view corresponds to a location of the representative block of the current depth PU in the depth component. The one or more processors are further configured to determine that motion parameters of the co-located texture block are unavailable and, in response to the determination that motion parameters of the co-located texture block are unavailable, determine that a sub-PU motion parameter inheritance candidate is unavailable for inclusion in the motion parameter candidate list for the current depth PU. The one or more processors are further configured to decode motion information for the current depth PU based on the motion parameter candidate list for the current depth PU without the sub-PU motion parameter inheritance candidate.

A device including video decoder 30 is also an example of a video decoding device comprising a memory storing a coded video bitstream that includes multiview video data, and one or more processors. The one or more processors are configured to generate a motion parameter candidate list for a current depth prediction unit (PU) in a depth component of a current view of the multiview video data. The one or more processors are further configured to derive a sub-PU motion parameter inheritance candidate for inclusion in the motion parameter candidate list for the current depth PU only if a partition mode of the current depth PU is 2N×2N, and decode the current depth PU based on the motion parameter candidate list for the current depth PU.

Figure 11:
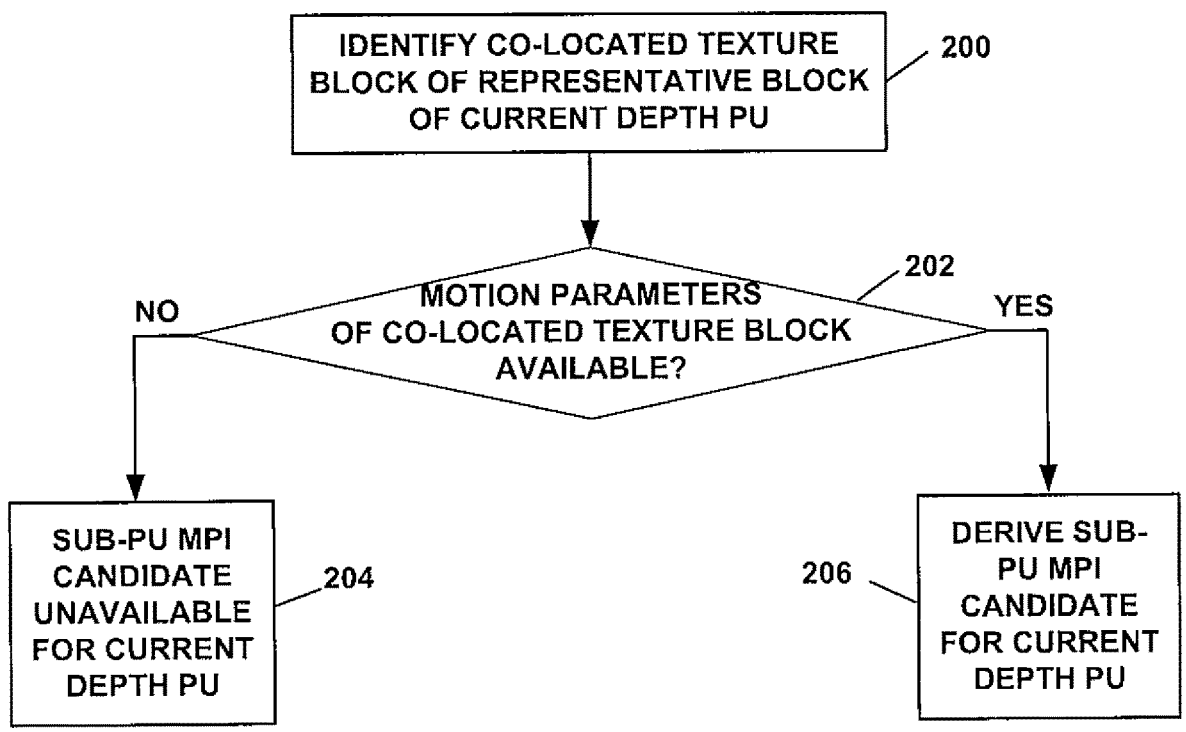
FIG. 11 is a flow diagram illustrating an example method for determining whether a sub-PU MPI candidate is available for inclusion in a motion parameter candidate list for a current depth PU.

FIG. 11 is a flow diagram illustrating an example method for determining whether a sub-PU MPI candidate is available for inclusion in a motion parameter candidate list for a current depth PU. The example method of FIG. 11 may be performed by a video coder, e.g., video encoder 20 and/or video decoder 30, such as the inter-prediction processing unit 120, motion compensation unit 124, and/or motion compensation unit 164 thereof, as part of a depth encoding and/or depth decoding process. More particularly, a video coder may perform the example method of FIG. 11 as part of a motion parameter candidate list, e.g., merge candidate list, generation process for motion parameter prediction, e.g., according to the merge mode, of a current depth PU.

According to the example method of FIG. 11, the video coder identifies a co-located texture block of a representative block of a current depth PU, the co-located texture block in a texture component associated with the depth component of the current depth PU, i.e., the texture and depth components are part of the same view and access unit of multiview video data (200). The co-located texture block may be a co-located texture PU. In some examples, the video coder determines a sub-PU size for the current depth PU, and identifies the representative block of the current depth PU based on the sub-PU size. The video coder may further identify a reference sample location in the texture component as a function of the sub-PU size, and identify a texture block that is in the texture component of the current view and that covers the reference sample location as the co-located texture block of the representative block of the current depth PU. In some examples, the reference sample location is a luma location (xText, yText), and is derived by:

$$x\text{TextFull} = x\text{Pb} + (n\text{PbW}/n\text{SbW}/2) * n\text{SbW} + n\text{SbW}/2 \quad \text{(H-161)}$$

$$y\text{TextFull} = y\text{Pb} + (n\text{PbH}/n\text{SbH}/2) * n\text{SbH} + n\text{SbH}/2 \quad \text{(H-162)}$$

$$x\text{Text} = (x\text{TextFull} >> 3) << 3 \quad \text{(H-163)}$$

$$y\text{Text} = (y\text{TextFull} >> 3) << 3 \quad \text{(H-164)}$$

According to the example method of FIG. 11, the video coder further determines whether motion parameters of the co-located texture block are available (202). If motion parameters of the co-located texture block are unavailable, the video coder determines that the sub-PU MPI candidate is unavailable for inclusion in the motion parameter candidate list for the current depth PU (204). If motion parameters of the co-located texture block are available, and assuming the sub-PU MPI candidate is otherwise available, the video coder may derive the sub-PU MPI candidate for inclusion in the motion parameter candidate list for the current depth PU, e.g., using any of the techniques described herein, e.g., as described above with respect to FIG. 7 (206).

For example, the video coder may divide the current depth PU into a plurality of sub-PUs. For each respective sub-PU from the plurality of sub-PUs, the video coder may determine a reference sample location in the texture component of the current view, and determine a reference block that is in the texture component of the current view and that covers the reference sample location. If motion parameters of the reference block are available, set candidate motion parameters of the respective sub-PU based on motion parameters of the sub-PU level reference block, and if motion parameters of the reference block are not available, set candidate motion parameters of the respective sub-PU based on motion parameters of the co-located texture block of the previously-identified representative block of the current depth PU. The video coder may further derive the sub-PU motion parameter inheritance candidate based on the candidate motion parameters of the plurality of sub-PUs, e.g., to be the RMP as described above with respect to FIG. 7.

Figure 12:
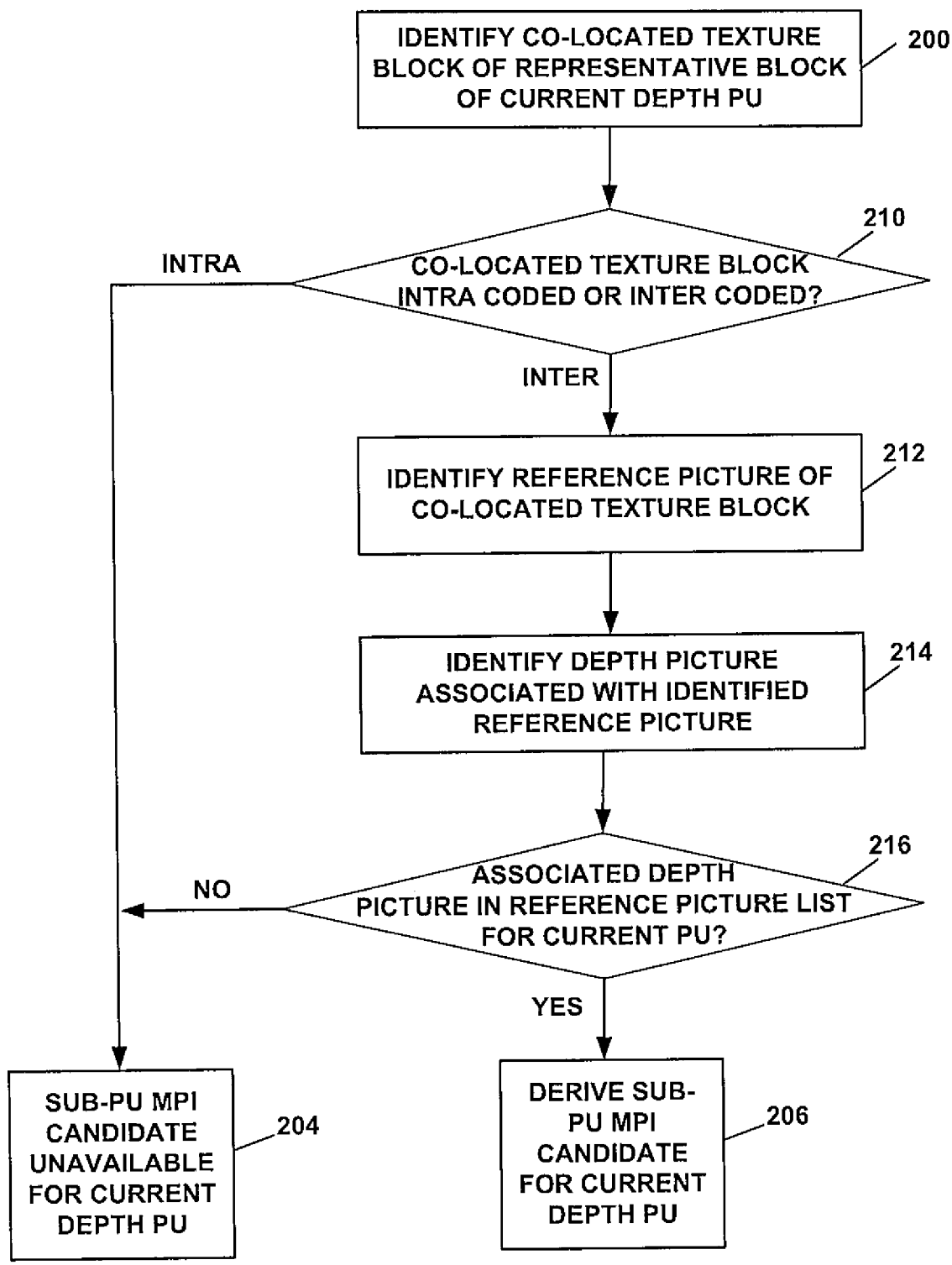
FIG. 12 is a flow diagram illustrating example techniques for determining whether motion parameters of a co-located texture block of a representative block of the current depth PU are available.

FIG. 12 is a flow diagram illustrating example techniques for determining whether motion parameters of a co-located texture block of the current depth PU are available. The example method of FIG. 12 may be performed by a video coder, e.g. video encoder 20 and/or video decoder 30, such as the inter-prediction processing unit 120 and motion compensation unit 164 thereof, as part of a depth encoding and/or depth decoding process. More particularly, a video coder may perform the example method of FIG. 12 as part of a motion parameter candidate list, e.g., merge candidate list, generation process for motion parameter prediction, e.g., according to the merge mode, of a current depth PU.

According to the example method of FIG. 12, the video coder identifies a co-located texture block of a representative block of the current depth PU, as described above (200). The video coder then determines whether the co-located texture block was intra coded or inter coded (210). If the co-located texture block was intra coded, e.g., the variable textPredFlagLX[xRef][yRef] is not equal to 1 for X=0 or X=1, the video coder determines that the sub-PU MPI candidate is unavailable for inclusion in the motion parameter candidate list for the current depth PU (204).

If the co-located texture block was inter coded, e.g., the variable textPredFlagLX[xRef][yRef] is equal to 1 for X=0 or X=1, the video coder identifies a reference picture of the co-located texture block, e.g., as specified by the reference picture list and reference picture index specified by the motion parameters of the co-located texture block (212). The video coder may then identify a depth picture associated with the identified reference picture, e.g., the depth picture in the same view and access unit as the identified reference picture (214). The video coder may then determine whether the associated depth picture is included in the reference picture list(s) for the current depth PU (216).

If the associated depth picture is not included in the reference picture list(s) for the current depth PU, e.g., if PicOrderCnt(RefPicListX[i]) is not equal to PicOrderCnt(textRefPicListX[textRefIdxLX]) or ViewIdx(RefPicListX[i]) is not equal to ViewIdx(textRefPicListX[textRefIdxLX]), the video coder may determine that the sub-PU MPI candidate is unavailable for inclusion in the motion parameter candidate list for the current depth PU (204). If the associated depth picture is included in the reference picture list(s) for the current depth PU, e.g., if PicOrderCnt(RefPicListX[i]) is equal to PicOrderCnt(textRefPicListX[textRefIdxLX]) and ViewIdx(RefPicListX[i]) is not equal to ViewIdx(textRefPicListX[textRefIdxLX]), the video coder may derive the sub-PU MPI candidate for inclusion in the motion parameter candidate list for the current depth PU, e.g., using any of the techniques described herein, assuming that the sub-PU MPI candidate is otherwise available (206).

Figure 13:
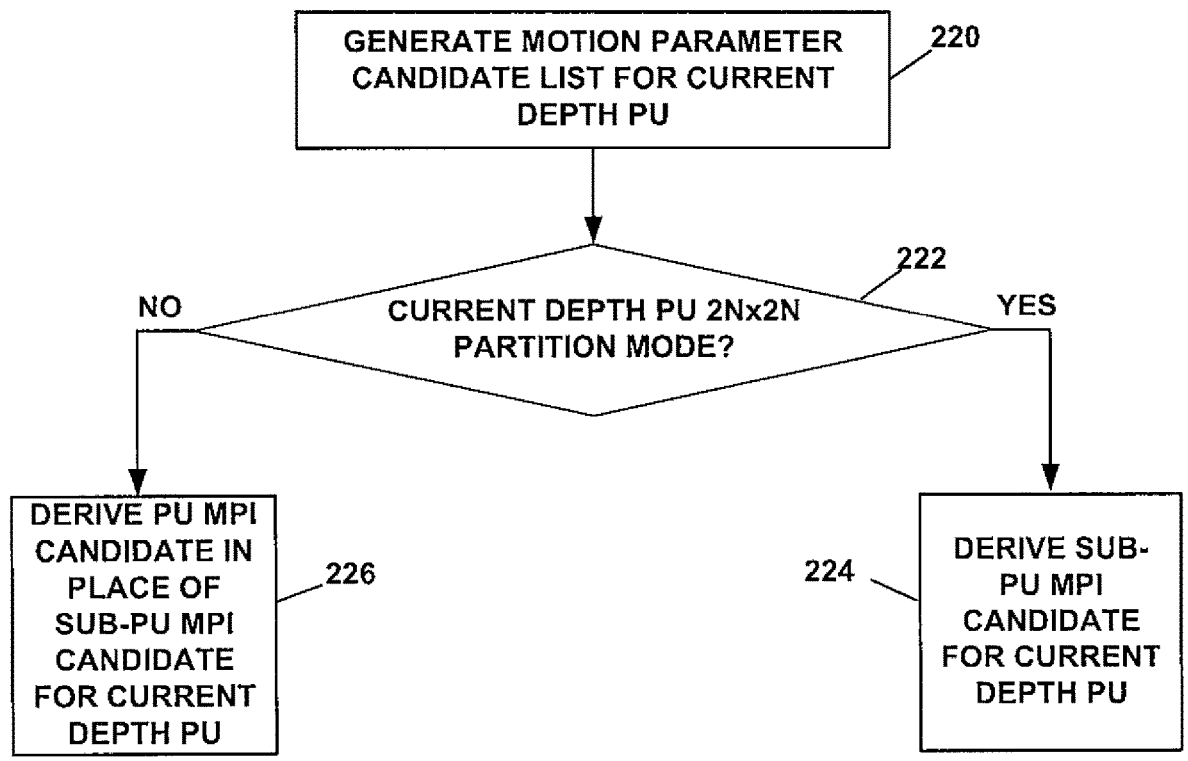
FIG. 13 is a flow diagram illustrating an example method for determining whether to include a sub-PU MPI candidate in a motion parameter candidate list for a current depth PU.

FIG. 13 is a flow diagram illustrating an example method for determining whether to include a sub-PU MPI candidate in a motion parameter candidate list for a current depth PU. The example method of FIG. 13 may be performed by a video coder, e.g. video encoder 20 and/or video decoder 30, such as the inter-prediction processing unit 120 and motion compensation unit 164 thereof, as part of a depth encoding and/or depth decoding process. More particularly, a video coder may perform the example method of FIG. 13 as part of a motion parameter candidate list, e.g., merge candidate list, generation process for motion parameter prediction, e.g., according to the merge mode, of a current depth PU.

According to the example method of FIG. 13, the video coder generates a motion parameter candidate list, e.g., merge candidate list, for a current depth PU (220). As part of the candidate list construction process, the video coder determines whether the partition mode of the current depth PU is 2N×2N (222). If the partition mode of the current depth PU is 2N×2N, and the sub-PU MPI candidate is otherwise available, the video coder may derive the sub-PU MPI candidate for inclusion in the motion parameter candidate list for the current depth PU (224). If the partition mode of the current depth PU is other than 2N×2N, the video coder may derive a PU MPI candidate, e.g., PU level MPI candidate, candidate for inclusion in the motion parameter candidate list for the current depth PU in place of the sub-PU MPI candidate, e.g., at the first position of the motion parameter candidate list (226). The partition mode of the current depth PU other than 2N×2N may be, as examples, one of 2N×N, 2N×nU, 2N×nD, N×2N, nL×2N, nR×2N or N×N.

The video coder may derive the PU MPI candidate instead of the sub-PU MPI candidate according to the techniques described above with respect to FIG. 6. For example, the video coder may determine a reference sample location in a texture component of the current view based on a size of the current depth PU and a location of the current depth PU, determine a reference block that is in the texture component of the current view and that covers the reference sample location and, if motion parameters of the reference block are available, derive the PU MPI candidate based on motion parameters of the reference block. In some examples, to derive the PU MPI candidate instead of the sub-PU MPI candidate, the video coder may set a sub-PU size for a sub-PU MPI candidate derivation process, e.g., as described herein with respect to FIG. 7, to the size of the current depth PU, and derive the PU motion parameter inheritance candidate, if the partition mode of the depth PU is other than 2N×2N, according to the sub-PU motion parameter inheritance candidate derivation process with the sub-PU size set to the size of the current depth PU. To set the sub-PU size for a sub-PU MPI candidate derivation process to the size of the current depth PU, the video coder may derive the variables nSbW and nSbH are derived as specified in the following:

$$nSbW=nPbW \qquad (H\text{-}159)$$

$$nSbH=nPbH \qquad (H\text{-}160)$$

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding multiview video data, the method comprising:
generating a motion parameter candidate list for a first depth prediction unit (PU) in a depth component of a current view of the multiview video data, wherein generating the motion parameter candidate list for the first depth PU comprises:
dividing the first depth PU into a first plurality of sub-PUs;
identifying a first co-located texture block, wherein a location of the first co-located texture block in a texture component of the current view corresponds to a location of a representative block of the first depth PU, wherein the representative block of the first depth PU is a first-occurring sub-PU of the first plurality of sub-PUs in raster scan order of the first depth PU or a center sub-PU of the first plurality of sub-PUs;
determining whether motion parameters of the first co-located texture block are unavailable; and
in response to the determination that motion parameters of the first co-located texture block are unavailable, determining that a first sub-PU motion parameter inheritance candidate is unavailable for inclusion in the motion parameter candidate list for the first depth PU;
decoding motion information for the first depth PU based on the motion parameter candidate list for the first depth PU without the first sub-PU motion parameter inheritance candidate;
generating a motion parameter candidate list for a second depth PU in the depth component of the current view, wherein generating the motion parameter candidate list for the second depth PU comprises:
dividing the second depth PU into a second plurality of sub-PUs;
identifying a second co-located texture block, wherein a location of the second co-located texture block in the texture component of the current view corresponds to a location of a representative block of the second depth PU, wherein the representative block of the second depth PU is a first-occurring sub-PU of the second plurality of sub-PUs in raster scan order of the second depth PU or a center sub-PU of the second plurality of sub-PUs;

determining whether motion parameters of the second co-located texture block are unavailable; and in response to determining that the motion parameters of the second co-located texture block are available, generating a second sub-PU motion parameter inheritance candidate for inclusion in the motion parameter candidate list for the second depth PU, wherein the second sub-PU motion parameter inheritance candidate comprises a respective set of motion parameters for each sub-PU of the second plurality of sub-PUs; and decoding motion information for the second depth PU based on the motion parameter candidate list for the second depth PU, wherein the motion parameter candidate list for the second depth PU includes the second sub-PU motion parameter inheritance candidate.

2. The method of claim 1, further comprising determining that the second depth PU is coded with partition mode 2N×2N, wherein deriving the second sub-PU motion parameter inheritance candidate comprises deriving the second sub-PU motion parameter inheritance candidate based on the determination that the second depth PU is coded with partition mode 2N×2N.

3. The method of claim 1, further comprising:

generating a motion parameter candidate list for a third depth PU in the depth component of the current view;

identifying a third co-located texture block, wherein a location of the third co-located texture block in the texture component of the current view corresponds to a location of a representative block of the third depth PU;

determining that motion parameters of the third co-located texture block are available;

in response to the determination that motion parameters of the third co-located texture block are available, determining that the third depth PU is coded with a partition mode other than partition mode 2N×2N;

in response to the determination that the third depth PU is coded with a partition mode other than partition mode 2N×2N, deriving a PU motion parameter inheritance candidate, instead of a third sub-PU motion parameter inheritance candidate, for inclusion in the motion parameter candidate list for the third depth PU in place of the third sub-PU motion parameter inheritance candidate; and decoding motion information for the third depth PU based on the motion parameter candidate list for the third depth PU, wherein the motion parameter candidate list for the third depth PU includes the PU motion parameter inheritance candidate.

4. The method of claim 1, wherein deriving the second sub-PU motion parameter inheritance candidate comprises:

for each respective sub-PU from the second plurality of sub-PUs:

determining a reference sample location in the texture component of the current view;

determining a reference block that is in the texture component of the current view and that covers the reference sample location; and setting candidate motion parameters of the respective sub-PU such that if motion parameters of the reference block are available, the candidate motion parameters of the respective sub-PU are based on motion parameters of the reference block and such that if motion parameters of the reference block are not available, the candidate motion parameters of the respective sub-PU are based on motion parameters of the second co-located texture block; and deriving the second sub-PU motion parameter inheritance candidate based on the candidate motion parameters of the second plurality of sub-PUs.

5. The method of claim 1, wherein determining whether the motion parameters of the first co-located texture block are unavailable comprises:

determining that the first co-located texture block was intra-coded; and determining that the motion parameters of the first co-located texture block are unavailable in response to the determination that the first co-located texture block was intra-coded.

6. The method of claim 1, wherein determining whether motion parameters of the first co-located texture block are unavailable comprises:

determining that the first co-located texture block was inter-coded;

identifying a reference picture specified by the motion parameters of the first co-located texture block;

identifying a depth picture associated with the reference picture specified by the motion parameters of the first co-located texture block;

determining that a reference picture list of the first depth PU does not include the identified depth picture; and determining that the motion parameters of the first co-located texture block are unavailable in response to the determination that the reference picture list of the first depth PU does not include the identified depth picture.

7. The method of claim 1, wherein identifying the first co-located texture block comprises:

determining a sub-PU size specified for the first depth PU;

determining a reference sample location in the texture component of the current view as a function of the sub-PU size; and identifying a texture block that is in the texture component of the current view and that covers the reference sample location as the first co-located texture block of the representative block of the first depth PU.

8. The method of claim 1, wherein the motion parameter candidate list for the first depth PU is a merge candidate list.

9. The method of claim 1, wherein the co-located texture block is a co-located texture PU.

10. A method for encoding multiview video data, the method comprising:

generating a motion parameter candidate list for a first depth prediction unit (PU) in a depth component of a current view of the multiview video data, wherein generating the motion parameter candidate list for the first depth PU comprises:

dividing the first depth PU into a first plurality of sub-PUs;

identifying a first co-located texture block to a representative block of the first depth PU, wherein a location of the first co-located texture block in a texture component of the current view corresponds to a location of the representative block of the first depth PU, wherein the representative block of the first depth PU is a first-occurring sub-PU of the first plurality of sub-PUs in raster scan order of the first depth PU or a center sub-PU of the first plurality of sub-PUs;

determining whether motion parameters of the first co-located texture block are unavailable; and in response to the determination that motion parameters of the first co-located texture block are unavailable, determining that a first sub-PU motion parameter inheritance candidate is unavailable for inclusion in the motion parameter candidate list for the first depth PU;

encoding motion information for the first depth PU based on the motion parameter candidate list for the first depth PU without the first sub-PU motion parameter inheritance candidate;

generating a motion parameter candidate list for a second depth PU in the depth component of the current view, wherein generating the motion parameter candidate list for the second depth PU comprises:

dividing the second depth PU into a second plurality of sub-PUs;

identifying a second co-located texture block, wherein a location of the second co-located texture block in the texture component of the current view corresponds to a location of a representative block of the second depth PU, wherein the representative block of the second depth PU is a first-occurring sub-PU of the second plurality of sub-PUs in raster scan order of the second depth PU or a center sub-PU of the second plurality of sub-PUs;

determining whether motion parameters of the second co-located texture block are unavailable; and in response to determining that the motion parameters of the second co-located texture block are available, generating a second sub-PU motion parameter inheritance candidate for inclusion in the motion parameter candidate list for the second depth PU, wherein the second sub-PU motion parameter inheritance candidate comprises a respective set of motion parameters for each sub-PU of the second plurality of sub-PUs; and encoding motion information for the second depth PU based on the motion parameter candidate list for the second depth PU, wherein the motion parameter candidate list for the second depth PU includes the second sub-PU motion parameter inheritance candidate.

11. The method of claim 10, further comprising determining that the second depth PU is coded with partition mode 2N×2N, wherein deriving the second sub-PU motion parameter inheritance candidate comprises deriving the second sub-PU motion parameter inheritance candidate based on the determination that the second depth PU is coded with partition mode 2N×2N.

12. The method of claim 10, further comprising:
generating a motion parameter candidate list for a third depth PU in the depth component of the current view;
identifying a third co-located texture block, wherein a location of the third co-located texture block in the texture component of the current view corresponds to a location of a representative block of the third depth PU;
determining that motion parameters of the third co-located texture block are available;
in response to the determination that motion parameters of the third co-located texture block are available, determining that the third depth PU is coded with a partition mode other than partition mode 2N×2N;
in response to the determination that the third depth PU is coded with a partition mode other than partition mode 2N×2N, deriving a PU motion parameter inheritance candidate, instead of a third sub-PU motion parameter inheritance candidate, for inclusion in the motion parameter candidate list for the third depth PU in place of the third sub-PU motion parameter inheritance candidate; and encoding motion information for the third depth PU based on the motion parameter candidate list for the third depth PU, wherein the motion parameter candidate list for the third depth PU includes the PU motion parameter inheritance candidate.

13. The method of claim 10, wherein deriving the second sub-PU motion parameter inheritance candidate comprises:
for each respective sub-PU from the second plurality of sub-PUs:
determining a reference sample location in the texture component of the current view;
determining a reference block that is in the texture component of the current view and that covers the reference sample location; and
setting candidate motion parameters of the respective sub-PU such that if motion parameters of the reference block are available, the candidate motion parameters of the respective sub-PU are based on motion parameters of the reference block and such that if motion parameters of the reference block are not available, the candidate motion parameters of the respective sub-PU are based on motion parameters of the second co-located texture block; and
deriving the second sub-PU motion parameter inheritance candidate based on the candidate motion parameters of the second plurality of sub-PUs.

14. The method of claim 10, wherein determining whether the motion parameters of the first co-located texture block are unavailable comprises:
determining that the first co-located texture block was intra-coded; and
determining that the motion parameters of the first co-located texture block are unavailable in response to the determination that the first co-located texture block was intra-coded.

15. The method of claim 10, wherein determining whether motion parameters of the first co-located texture block are unavailable comprises:
determining that the first co-located texture block was inter-coded;
identifying a reference picture specified by the motion parameters of the first co-located texture block;
identifying a depth picture associated with the reference picture specified by the motion parameters of the first co-located texture block;
determining that a reference picture list of the first depth PU does not include the identified depth picture; and
determining that the motion parameters of the first co-located texture block are unavailable in response to the determination that the reference picture list of the first depth PU does not include the identified depth picture.

16. The method of claim 10, wherein identifying the first co-located texture block comprises:
determining a sub-PU size specified for the first depth PU;
determining a reference sample location in the texture component of the current view as a function of the sub-PU size; and
identifying a texture block that is in the texture component of the current view and that covers the reference sample location as the first co-located texture block of the representative block of the first depth PU.

17. The method of claim 10, wherein the motion parameter candidate list for the first depth PU is a merge candidate list.

18. The method of claim 10, wherein the co-located texture block is a co-located texture PU.

19. A video coding device comprising:
a memory storing a coded video bitstream that includes multiview video data; and
one or more processors configured to:
  generate a motion parameter candidate list for a current depth prediction unit (PU) in a depth component of a current view of the multiview video data, wherein the one or more processors are configured such that, as part of generating the motion parameter candidate list for the depth PU, the one or more processors:
    divide the current depth PU into a plurality of sub-PUs;
    identify a co-located texture block, wherein a location of the co-located texture block in a texture component of the current view corresponds to a location of a representative block of the current depth PU, wherein the representative block of the current depth PU is a first-occurring sub-PU of the plurality of sub-PUs in raster scan order of the current depth PU or a center sub-PU of the plurality of sub-PUs;
    determine whether motion parameters of the co-located texture block are unavailable;
    in response to the determination that motion parameters of the co-located texture block are unavailable, determine that a sub-PU motion parameter inheritance candidate is unavailable for inclusion in the motion parameter candidate list for the current depth PU; and
    in response to determining that the motion parameters of the co-located texture block are available, generate the sub-PU motion parameter inheritance candidate, wherein the sub-PU motion parameter inheritance candidate comprises a respective set of motion parameters for each sub-PU of the plurality of sub-PUs; and
  code motion information for the current depth PU based on the motion parameter candidate list for the current depth PU, wherein the motion parameter candidate list for the current depth PU does not include the sub-PU motion parameter inheritance candidate when the sub-PU motion parameter inheritance candidate is unavailable and the motion parameter candidate list for the current depth PU includes the sub-PU motion parameter inheritance candidate when the motion parameters of the co-located texture block are available.

20. The video coding device of claim 19, wherein the one or more processors are further configured to:
determine that the current depth PU is coded with partition mode 2N×2N; and
derive the sub-PU motion parameter inheritance candidate based on the determination that the current depth PU is coded with partition mode 2N×2N.

21. The video coding device of claim 19, wherein the one or more processors are further configured to:
generate a motion parameter candidate list for a second depth PU in the depth component of the current view;
identify a second co-located texture block, wherein a location of the second co-located texture block in the texture component of the current view corresponds to a location of a representative block of the second depth PU;
determine that motion parameters of the second co-located texture block are available;
in response to the determination that motion parameters of the second co-located texture block are available, determine that the second depth PU is coded with a partition mode other than partition mode 2N×2N;
in response to the determination that the second depth PU is coded with a partition mode other than partition mode 2N×2N, derive a PU motion parameter inheritance candidate, instead of a second sub-PU motion parameter inheritance candidate, for inclusion in the motion parameter candidate list for the second depth PU in place of the second sub-PU motion parameter inheritance candidate; and
code motion information for the second depth PU based on the motion parameter candidate list for the second depth PU, wherein the motion parameter candidate list for the second depth PU includes the PU motion parameter inheritance candidate.

22. The video coding device of claim 19, wherein the one or more processors are configured to derive the sub-PU motion parameter inheritance candidate by at least:
for each respective sub-PU from the plurality of sub-PUs:
  determining a reference sample location in the texture component of the current view;
  determining a reference block that is in the texture component of the current view and that covers the reference sample location; and
  setting candidate motion parameters of the respective sub-PU such that if motion parameters of the reference block are available, the candidate motion parameters of the respective sub-PU are based on motion parameters of the reference block and such that if motion parameters of the reference block are not available, the candidate motion parameters of the respective sub-PU are based on motion parameters of the second co-located texture block; and
deriving the sub-PU motion parameter inheritance candidate based on the candidate motion parameters of the plurality of sub-PUs.

23. The video coding device of claim 19, wherein the one or more processors are configured to:
determine that the co-located texture block was intra-coded; and
determine that the motion parameters of the co-located texture block are unavailable in response to the determination that the co-located texture block was intra-coded.

24. The video coding device of claim 19, wherein the one or more processors are configured to:
determine that the co-located texture block was inter-coded;
identify a reference picture specified by the motion parameters of the co-located texture block;
identify a depth picture associated with the reference picture specified by the motion parameters of the co-located texture block;
determine that a reference picture list of the current depth PU does not include the identified depth picture; and
determine that the motion parameters of the co-located texture block are unavailable in response to the determination that the reference picture list of the current depth PU does not include the identified depth picture.

25. The video coding device of claim 19, wherein the one or more processors are configured to:
determine a sub-PU size specified for the current depth PU;
determine a reference sample location in the texture component of the current view as a function of the sub-PU size; and identify a texture block that is in the texture component of the current view and that covers the reference sample location as the co-located texture block of the representative block of the current depth PU.

26. The video coding device of claim 19, wherein the motion parameter candidate list for the current depth PU is a merge candidate list.

27. The video coding device of claim 19, wherein the co-located texture block is a co-located texture PU.

28. A video coding device for coding multiview video data, the video coding device comprising:
  means for generating a motion parameter candidate list for a current depth prediction unit (PU) in a depth component of a current view of the multiview video data, wherein the means for generating the motion parameter candidate list for the current depth PU comprises:
    means for dividing the current depth PU into a plurality of sub-PUs;
    means for identifying a co-located texture block to a representative block of the current depth PU, wherein a location of the co-located texture block in a texture component of the current view corresponds to a location of the representative block of the current depth PU, wherein the representative block of the current depth PU is a first-occurring sub-PU of the plurality of sub-PUs in raster scan order of the current depth PU or a center sub-PU of the plurality of sub-PUs;
    means for determining whether motion parameters of the co-located texture block are unavailable;
    means for, in response to the determination that motion parameters of the co-located texture block are unavailable, determining that a sub-PU motion parameter inheritance candidate is unavailable for inclusion in the motion parameter candidate list for the current depth PU; and
    means for generating, in response to determining that the motion parameters of the co-located texture block are available, the sub-PU motion parameter inheritance candidate, wherein the sub-PU motion parameter inheritance candidate comprises a respective set of motion parameters for each sub-PU of the plurality of sub-PUs; and
  means for coding motion information for the current depth PU based on the motion parameter candidate list for the current depth PU, wherein the motion parameter candidate list for the current depth PU does not include the sub-PU motion parameter inheritance candidate when the sub-PU motion parameter inheritance candidate is unavailable and the motion parameter candidate list for the current depth PU includes the sub-PU motion parameter inheritance candidate when the motion parameters of the co-located texture block are available.

29. A computer-readable storage medium having instructions stored thereon that, when executed by one or more processors of a video coding device for coding multiview video data, cause the one or more processors to:
  generate a motion parameter candidate list for a current depth prediction unit (PU) in a depth component of a current view of the multiview video data, wherein as part of causing the one or more processors to generate the motion parameter candidate list for the current depth PU, execution of the instructions causes the one or more processors to:
    divide the current depth PU into a plurality of sub-PUs;
    identify a co-located texture block to a representative block of the current depth PU, wherein a location of the co-located texture block in a texture component of the current view corresponds to a location of the representative block of the current depth PU, wherein the representative block of the current depth PU is a first-occurring sub-PU of the plurality of sub-PUs in raster scan order of the current depth PU or a center sub-PU of the plurality of sub-PUs;
    determine whether motion parameters of the co-located texture block are unavailable;
    in response to the determination that motion parameters of the co-located texture block are unavailable, determine that a sub-PU motion parameter inheritance candidate is unavailable for inclusion in the motion parameter candidate list for the current depth PU; and
    in response to determining that the motion parameters of the co-located texture block are available, generate the sub-PU motion parameter inheritance candidate, wherein the sub-PU motion parameter inheritance candidate comprises a respective set of motion parameters for each sub-PU of the plurality of sub-PUs; and
  code motion information for the current depth PU based on the motion parameter candidate list for the current depth PU, wherein the motion parameter candidate list for the current depth PU does not include the sub-PU motion parameter inheritance candidate when the sub-PU motion parameter inheritance candidate is unavailable and the motion parameter candidate list for the current depth PU includes the sub-PU motion parameter inheritance candidate when the motion parameters of the co-located texture block are available.

* * * * *